(12) United States Patent
Imamura et al.

(10) Patent No.: US 8,088,034 B2
(45) Date of Patent: Jan. 3, 2012

(54) CONTROL DEVICE FOR HYBRID VEHICLE POWER TRANSMITTING APPARATUS

(75) Inventors: Tatsuya Imamura, Okazaki (JP); Yuji Iwase, Mishima (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 817 days.

(21) Appl. No.: 12/219,070

(22) Filed: Jul. 15, 2008

(65) Prior Publication Data
US 2009/0023548 A1 Jan. 22, 2009

(30) Foreign Application Priority Data

Jul. 17, 2007 (JP) ................................ 2007-185867

(51) Int. Cl.
*B60W 20/00* (2006.01)
(52) U.S. Cl. .................. 477/3; 477/5; 477/98; 180/65.1
(58) Field of Classification Search .............. 477/3, 5, 477/98
See application file for complete search history.

(56) References Cited

U.S. PATENT DOCUMENTS

| | | | | |
|---|---|---|---|---|
| 5,275,069 A | * | 1/1994 | Baba et al. ................ | 475/117 |
| 5,803,863 A | * | 9/1998 | Hayward et al. ............ | 477/98 |
| 5,961,419 A | * | 10/1999 | Hisano et al. ............... | 477/97 |
| 6,488,608 B2 | * | 12/2002 | Yamaguchi et al. .......... | 477/3 |
| 6,641,498 B2 | * | 11/2003 | Okuwaki .................. | 475/117 |
| 7,846,061 B2 | * | 12/2010 | Steinborn et al. ........... | 477/5 |
| 2002/0155922 A1 | * | 10/2002 | Okuwaki .................. | 477/98 |
| 2007/0142168 A1 | * | 6/2007 | DeMarco .................. | 477/41 |
| 2009/0023548 A1 | * | 1/2009 | Imamura et al. ............ | 477/3 |
| 2010/0000814 A1 | * | 1/2010 | Katsuta et al. ............ | 180/65.265 |
| 2010/0234169 A1 | * | 9/2010 | Miyazaki et al. ........... | 477/3 |

FOREIGN PATENT DOCUMENTS

| JP | A-2003-97310 | 4/2003 |
|---|---|---|
| JP | A-2006-46386 | 2/2006 |

OTHER PUBLICATIONS

First Office Action for corresponding Chinese Patent Application No. 2008101315751, dated Feb. 10, 2011 (w/ English translation).

* cited by examiner

*Primary Examiner* — J. Allen Shriver, II
*Assistant Examiner* — James Triggs
(74) *Attorney, Agent, or Firm* — Oliff & Berridge, PLC

(57) ABSTRACT

This invention relates to a control device for a hybrid vehicle power transmitting apparatus. A heat generation control is executed to increase a heat generation amount of an electric motor M1 when a differential portion 11 is placed in a non-differential state and a temperature of a shifting mechanism 10 is less than a given transmitting apparatus temperature determining value $TEMP_{11}$. This allows the first electric motor M1 to develop a heat with which the temperature of a shifting mechanism 10 is promptly raised, thereby promptly completing a warm-up of the shifting mechanism 10 to achieve improved fuel consumption.

11 Claims, 13 Drawing Sheets

| | C0 | C1 | C2 | B0 | B1 | B2 | B3 | SHIFTING RATIO | STEP |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | ○ | | 3.209 | |
| N | | | | | | | | | |

○ ENGAGED
◎ ENGAGED UPON STEP-VARIABLE
  RELEASED UPON CONTINUOUSLY-VARIABLE

|  | C1 | C2 | B1 | B2 | B3 | SHIFTING RATIO | STEP |
|---|---|---|---|---|---|---|---|
| 1st | O |  |  |  | O | 3.357 | 1.54 |
| 2nd | O |  |  | O |  | 2.180 | 1.53 |
| 3rd | O |  | O |  |  | 1.424 | 1.42 |
| 4th | O | O |  |  |  | 1.000 | TOTAL |
| R |  | O |  |  | O | 3.209 | 3.36 |
| N |  |  |  |  |  |  |  |

O ENGAGED

CONTROL DEVICE FOR HYBRID VEHICLE POWER TRANSMITTING APPARATUS

TECHNICAL FIELD

The present invention relates to a control device for a hybrid vehicle power transmitting apparatus for use in a hybrid vehicle having an internal combustion engine and an electric motor. More particularly, it relates to a technology of facilitating a warm-up of the hybrid vehicle power transmitting apparatus.

BACKGROUND ART

There has been known a hybrid vehicle power transmitting apparatus including a differential mechanism for distributing an output of an engine, such as an internal combustion engine to a power transmitting path between a first electric motor and drive wheels, a differential-action limiting device that limits a differential action of the differential mechanism or canceling such a differential action, and a second electric motor connected to a power transmitting apparatus extending from the differential mechanism to the drive wheels. For instance, Patent Publication 1 (Japanese Patent Application Publication No. 2006-46386) discloses in FIG. 1 such a hybrid vehicle power transmitting apparatus. With a control device for the hybrid vehicle power transmitting apparatus, if a need for warming up an exhaust system is determined, such as for instance a catalyst of the engine, the engine is driven at a given engine warm-up rotation speed, while the differential mechanism is placed under a differential state enabling a differential action to be initiated.

With the control device for the hybrid vehicle power transmitting apparatus disclosed in Patent Publication 1, it will suffice for an engine rotation speed not to be bound with a vehicle speed due to the differential action of the differential mechanism. This will be effective for facilitating the warm-up of the engine and an exhaust system thereof. However, the other component parts than those including the engine and the exhaust system thereof, i.e., for instance, the component parts of the hybrid vehicle power transmitting apparatus involving the differential mechanism are required to warm up, for allowing lubricating oil to have appropriate viscosity or the like. Speeding up such a warm-up operation leads to improvement in fuel consumption as a whole. However, the control device, disclosed in Patent Publication 1, does not necessarily have such an effect of facilitating the warm-up of the hybrid vehicle power transmitting apparatus.

SUMMARY OF THE INVENTION

The present invention has been completed with such a view in mind, and has an object to provide a control device for a hybrid vehicle power transmitting apparatus for use in a hybrid vehicle, having an internal combustion engine and an electric motor, which control device facilitates a warm-up of the hybrid vehicle power transmitting apparatus.

A first aspect of the invention relates to a control device for a hybrid vehicle power transmitting apparatus. The hybrid vehicle power transmitting apparatus comprises (i) an electrically controlled differential portion having a differential mechanism connected between an internal combustion engine and drive wheels and at least one electric motor connected to the differential mechanism in a power transmissive state for controlling a differential state of the differential mechanism upon controlling an operating state of the electric motor, (ii) a shifting portion forming part of a power transmitting path, and (iii) a differential-state switching mechanism for switching the electrically controlled differential portion in a differential state operative to establish a differential action and a non-differential state in which the differential action is disabled.

The control device executes a heat generation control for increasing a heat generation amount of the at least one electric motor when the electrically controlled differential portion is placed under the non-differential state and a temperature of the hybrid vehicle power transmitting apparatus is less than a given on-non-differential-state temperature determining value.

In a second aspect of the invention the control device alters an operating point of the electrically controlled differential portion, representing a condition for determining a relative rotation speed between rotary elements forming the differential mechanism, so as to increase a temperature of the at least one electric motor when the electrically controlled differential portion is placed under the differential state and the temperature of the hybrid vehicle power transmitting apparatus is less than a given on-differential-state temperature determining value.

In a third aspect of the invention, the electrically controlled differential portion includes a first electric motor and a second electric motor forming the electric motor; the differential mechanism includes a first rotary element connected to the internal combustion engine in a power transmissive state, a second rotary element connected to the first electric motor in a power transmissive state, and a third rotary element connected to the second electric motor in a power transmissive state; and the control device executes the heat generation control upon increasing a heat generation amount of at least one of the first electric motor and the second electric motor.

In a fourth aspect of the invention, the electrically controlled differential portion operates to act as a continuously variable shifting mechanism by controlling an operating state of the first electric motor.

A fifth aspect of the invention relates to a control device for a hybrid vehicle power transmitting apparatus. The hybrid vehicle power transmitting apparatus has at least one electric motor connected to a power transmitting path extending from an internal combustion engine to drive wheels, and a shifting portion forming part of the power transmitting path. The control device executes a heat generation control to increase a heat generation amount of the at least one electric motor when a temperature of the hybrid vehicle power transmitting apparatus is less than a given transmitting apparatus temperature determining value.

In a sixth aspect of the invention, the control device executes the heat generation control such that the lower the temperature of the hybrid vehicle power transmitting apparatus, the greater will be the heat generation amount of the at least one electric motor.

In a seventh aspect of the invention, the control device determines the temperature of the hybrid vehicle power transmitting apparatus based on a temperature of liquid prevailing in the hybrid vehicle power transmitting apparatus.

In a eighth aspect of the invention, when a temperature of the at least one electric motor exceeds a given motor-temperature determining value, the control device cancels the heat generation control, performed using the electric motor laying at a temperature above the motor-temperature determining value, regardless of the temperature of the hybrid vehicle power transmitting apparatus.

In a ninth aspect of the invention, the shifting portion includes a step-variable automatic shifting portion whose speed ratio is automatically varied.

According to the first aspect of the present invention, when the electrically controlled differential portion is placed under the non-differential state and the temperature of the hybrid vehicle power transmitting apparatus is less than the given on-non-differential-state temperature determining value, the heat generation control is executed for increasing the heat generation amount of the at least one electric motor. This can promptly increase the temperature of the hybrid vehicle power transmitting apparatus. In addition, with the hybrid vehicle power transmitting apparatus promptly completed in warm-up, improved fuel consumption can be achieved with the hybrid vehicle power transmitting apparatus as a whole.

According to the second aspect of the present invention, the electrically controlled differential portion is placed under the differential state and the temperature of the hybrid vehicle power transmitting apparatus is less than the given on-differential-state temperature determining value. When this takes place, the operating point of the electrically controlled differential portion, representing the condition for determining the relative rotation speed between the rotary elements forming the differential mechanism, is altered so as to increase the temperature of the at least one electric motor. Therefore, with the electrically controlled differential portion placed under the differential state, increasing the temperature of the electric motor promotes the warm-up of the hybrid vehicle power transmitting apparatus.

According to the third aspect of the present invention, the electrically controlled differential portion includes the first and second electric motors forming the electric motor. The heat generation control is performed upon increasing the heat generation amount of at least one of the first and second electric motors. This allows the first electric motor and/or the second electric motor to develop a heat. This promptly increases the temperature of the hybrid vehicle power transmitting apparatus, thereby facilitating the warm-up of the hybrid vehicle power transmitting apparatus.

According to the fourth aspect of the present invention, the electrically controlled differential portion is rendered operative to act as the continuously variable shifting mechanism upon controlling the operating state of the first electric motor. This can smoothly vary drive torque output from the electrically controlled differential portion. In addition, the electrically controlled differential portion operates not only to act as an electrically controlled continuously variable shifting mechanism upon continuously varying a speed ratio i.e. shifting ratio but also to act as a step-variable shifting mechanism upon varying the speed ratio step-by-step.

According to the fifth aspect of the present invention, the heat generation control is executed for increasing the heat generation amount of the at least one electric motor when the temperature of the hybrid vehicle power transmitting apparatus is less than the given transmitting apparatus temperature determining value. Thus, the heat of the electric motor promptly increases the temperature of the hybrid vehicle power transmitting apparatus. This allows the hybrid vehicle power transmitting apparatus to be promptly completed in warm-up and improved fuel consumption can be achieved as a whole.

According to the sixth aspect of the present invention, the heat generation control is performed such that the lower the temperature of the hybrid vehicle power transmitting apparatus, the greater will be the heat generation amount of the at least one electric motor. This prevents a delay in warm-up of the hybrid vehicle power transmitting apparatus even if the temperature of the hybrid vehicle power transmitting apparatus lies at a low level.

According to the seventh aspect of the present invention, the temperature of the hybrid vehicle power transmitting apparatus is determined based on the temperature of liquid prevailing in the hybrid vehicle power transmitting apparatus. Thus, detecting the temperature of such liquid enables the temperature of the hybrid vehicle power transmitting apparatus to be easily determined.

According to the eighth aspect of the present invention, when the temperature of the at least one electric motor exceeds the given motor-temperature determining value, the heat generation control, using the electric motor laying at the temperature above the motor-temperature determining value, is cancelled regardless of the temperature of the hybrid vehicle power transmitting apparatus. This prevents the temperature of the electric motor from exceeding a preliminarily supposed upper limit value, thereby precluding such a temperature from adversely affecting durability of the electric motor.

According to the ninth aspect of the present invention, the shifting portion includes the step-variable automatic shifting portion whose speed ratio is automatically varied. This enables the shifting portion to have the speed ratio varying in a wide range, and reducing operating load of a driver.

As used herein, preferably, the term "heat generation control" refers to a control in which output torque of at least one electric motor is increased with an increase in a heat generation amount of such an electric motor.

More preferably, at least one electric motor has an electric power generating function. The term "heat generation control" refers to a control in which increasing the amount of electric power generated by the electric motor having such an electric power generating function, increases the heat generation amount of the electric motor.

More preferably, output torque of the internal combustion engine is altered depending on fluctuation in output torque or a rotational load of the electric motor used in the heat generation control such that output torque of the hybrid vehicle power transmitting apparatus approaches that of the hybrid vehicle power transmitting apparatus with no execution of the heat generation control. With such an alteration, a vehicle occupant has almost no feeling of the heat control even if it is performed, thereby precluding the vehicle occupant from having an uncomfortable feeling.

More preferably, the electric motor used in executing the heat generation control is cooled with the use of liquid prevailing in the hybrid vehicle power transmitting apparatus. With such a structure, if the electric motor has an increasing heat generation amount, then a temperature of liquid prevailing in the hybrid vehicle power transmitting apparatus increases, thereby facilitating the warm-up of the hybrid vehicle power transmitting apparatus.

More preferably, the electric motor used in executing the heat generation control is accommodated in a case of the hybrid vehicle power transmitting apparatus.

BRIEF DESCRIPTION OF THE DRAWINGS

FIG. 12 is a skeleton diagram showing structure of a hybrid vehicle power transmitting apparatus which is a second embodiment, corresponding to FIG. 1.

FIG. 13 is a functional diagram illustrating combined operations of hydraulically operated frictional coupling devices for use in an automatic shifting portion provided in the hybrid vehicle power transmitting apparatus shown in FIG. 12, corresponding to FIG. 2.

FIG. 16, representing the relationship between these examples, is a view corresponding to FIG. 7.

BEST MODE FOR CARRYING OUT THE INVENTION

Now, various embodiments of the present invention will be described below in detail with reference to accompanying drawings.

First Embodiment

Figures 1, 2:
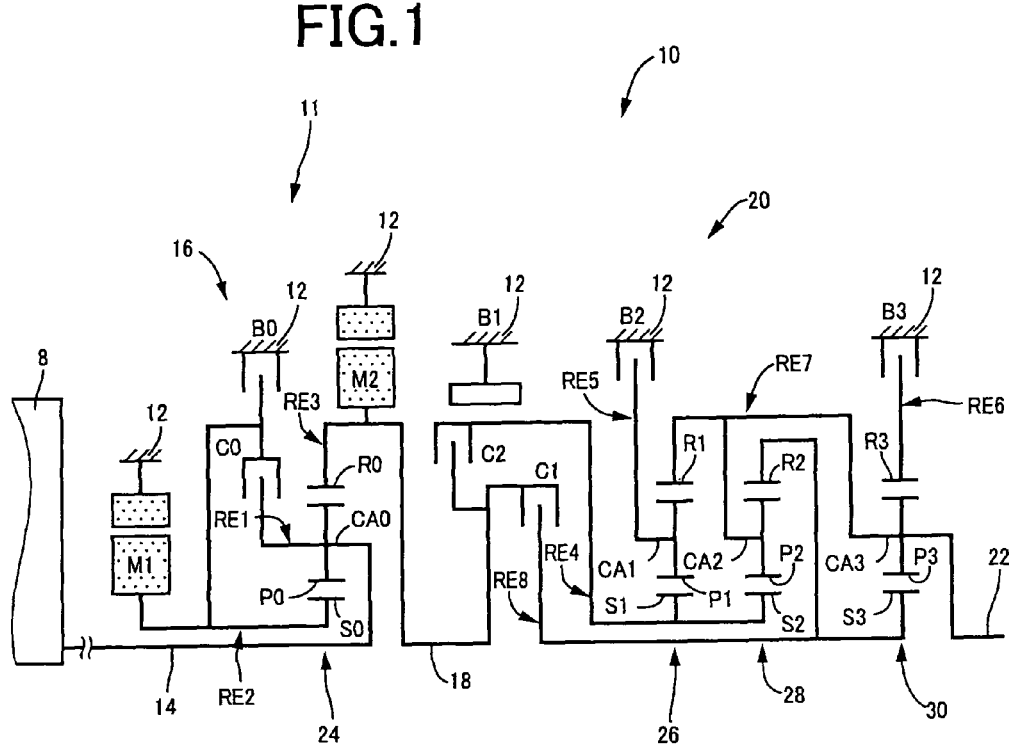
FIG. 1 is a skeleton view explaining a structure of a hybrid vehicle power transmitting apparatus to which a control device of the present invention is applied.
FIG. 2 is an engagement operation table illustrating the relationship between a shifting operation, in which the hybrid vehicle power transmitting apparatus shown in FIG. 1 is placed in a continuously variable or step-variable shifting state, and the operation of a hydraulic-type frictional engaging device in combination.

FIG. 1 is a skeleton view illustrating a shifting mechanism 10, forming part of a power transmitting apparatus for a hybrid vehicle, to which a control device of one embodiment according to the present invention is applied. As shown in FIG. 1, the shifting mechanism 10 includes an input shaft 14 serving as an input rotary member, a differential portion 11 directly connected to the input shaft 14 or indirectly connected thereto through a pulsation absorbing damper (vibration damping device) not shown, an automatic shifting portion 20 connected via a power transmitting member (transmission shaft) 18 in series through a power transmitting path between the differential mechanism 11 and drive wheels 38 (see FIG. 6) to serve as a step-variable type transmission, and an output shaft 22 connected to the automatic shifting portion 20 as an output rotary member. All of them are disposed in a transmission casing 12 (hereinafter briefly referred to as a "casing 12") serving as a non-rotary member connectedly mounted on a vehicle body.

Figure 6:
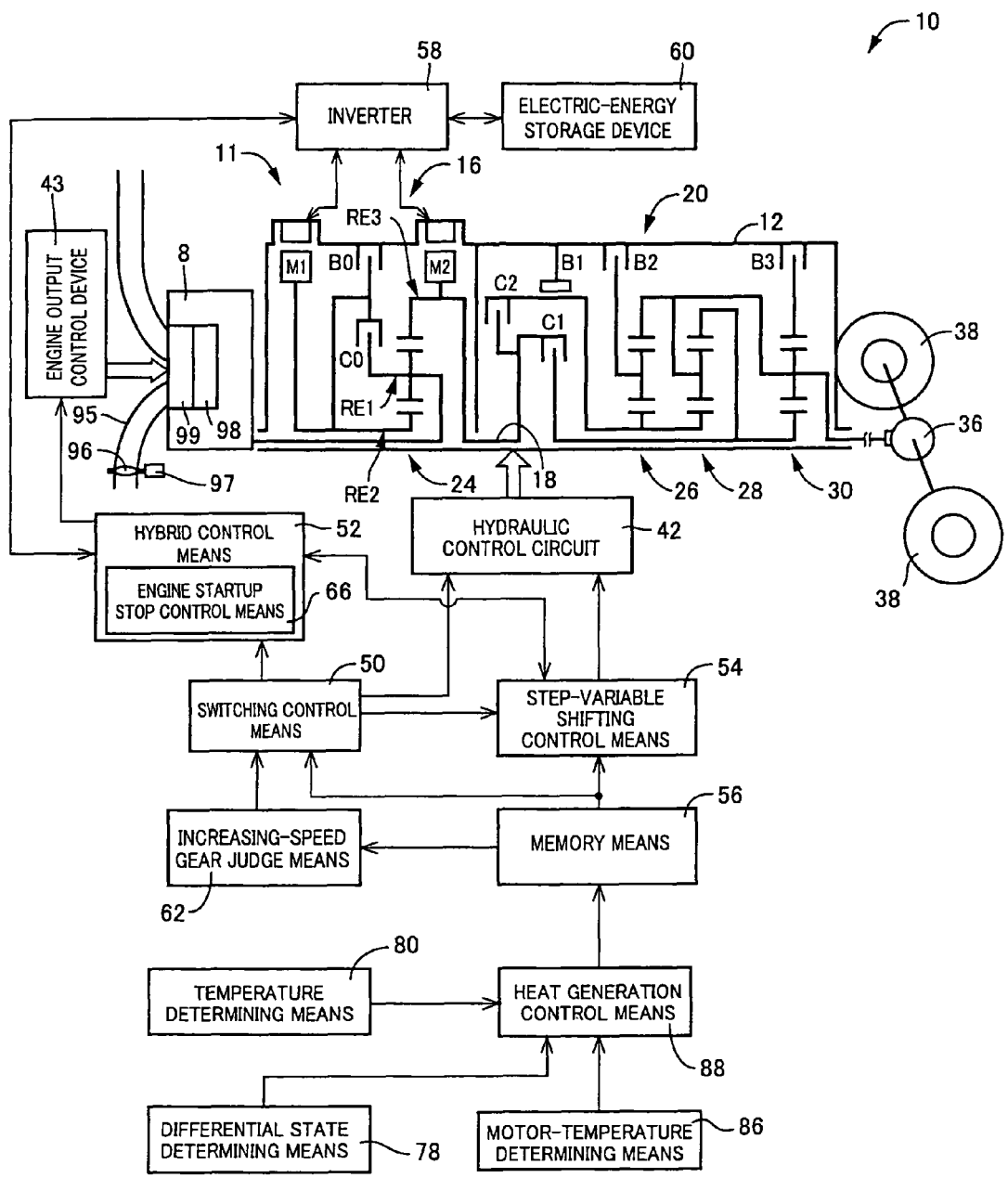
FIG. 6 is a functional block diagram illustrating a major control function to be executed by the electronic control device shown in FIG. 4.

The shifting mechanism 10, preferably applicable to a vehicle of FR type (front-engine rear-drive type), is disposed between a longitudinally mounted engine 8, i.e., an internal combustion engine such as a gasoline engine or a diesel engine serving as a drive force directly connected to the input shaft 14 or indirectly connected thereto via the pulsation absorbing damper, and a pair of drive wheels 38 (FIG. 6). This allows a vehicle drive force to be transmitted to the pair of drive wheels 38 on left and right in sequence through a differential gear device 36 (final speed reduction gear) and a pair of drive axles.

With the shifting mechanism 10 of the present embodiment, the engine 8 and the differential portion 11 are connected to each other in a direct connection. As used herein, the term "direct connection" may refer to a connection, established without intervening any fluid-type transmitting apparatus such as a torque converter or a fluid coupling, which involves a connection established with the use of the vibration damping device. Upper and lower halves of the shifting mechanism 10 are structured in symmetric relation with respect to an axis of the shifting mechanism 10 and, hence, the lower half is omitted in the skeleton view of FIG. 1.

The differential portion 11 can be said to be an electrically controlled differential portion in respect of an operation in which a differential state is altered using a first electric motor. The differential portion 11 includes a first electric motor M1, a power distributing mechanism 16 serving as a mechanical mechanism like a differential mechanism through which an output of the engine 8 inputted to the input shaft 14 is transferred to the first electric motor M1 and the power transmitting member 18, and a second electric motor M2 unitarily rotatable with the power transmitting member 18.

Further, the second electric motor M2 may be disposed at any portion of the power transmitting path extending from the power transmitting member 18 to the drive wheels 38. Moreover, the first and second electric motors M1 and M2 are so-called motor/generators each having a function even as an electric power generator. The first electric motor M1 has at least one function as an electric power generator that generates a reactive force, and the second electric motor M2 has at least a function as an electric motor serving as a drive force source to generate a drive force to run the vehicle.

The power distributing mechanism 16, corresponding to the differential mechanism of the present invention, mainly includes a differential-portion planetary gear unit 24 of a single pinion type having a given gear ratio $\rho 0$ of, for instance, about "0.418", a switching clutch C0 and a switching brake B0. The differential-portion planetary gear unit 24 includes rotary elements, such as a differential-portion sun gear S0, a differential-portion planetary gears P0, a differential-portion carrier CA0 supporting the differential-portion planetary gears P0 to be rotatable about its axis and about the axis of the differential-portion sun gear S0, and a differential-portion ring gear R0 meshing with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio $\rho 0$ is expressed as ZS0/ZR0.

With the power distributing mechanism 16 of such a structure, the differential-portion carrier CA0 is connected to the input shaft 14, i.e., to the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. With both the switching clutch C0 and the switching brake B0 being disengaged, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 11 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a given rotation speed.

That is, as the power distributing mechanism 16 is placed in the differential state, the differential portion 11 is also placed in differential state. In this casing, the differential portion 11 is placed in the continuously variable shifting state to operate as the electrically controlled continuously variable transmission with a speed ratio i.e. shifting ratio $\gamma 0$ (a ratio of rotation speed of the driving device input shaft 14 to the rotation speed of the power transmitting member 18) continuously varying in a value ranging from a minimum value $\gamma 0min$ to a maximum value $\gamma 0max$.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 is engaged to cause the differential-portion sun gear S0 and the differential-portion carrier CA0 to be unitarily coupled to each other, the power distributing mechanism 16 is placed in a locked state under which the differential-portion sun gear S0, the differential-portion carrier CA0 and the differential-portion ring gear R0, serving as the three elements of the differential-portion planetary gear unit 24, are caused to rotate together, i.e., in a unitarily rotating state under the non-differential state in which no differential action is effectuated.

Thus, the differential portion 11 is placed in the non-differential state. Therefore, the rotation speeds of the engine 8 and the power transmitting member 18 coincide with each other, so that the differential portion 11 (power distributing mechanism 16) is placed in a fixed shifting state, i.e., a step-variable shifting state to function as a transmission with the speed ratio $\gamma 0$ connected to a value of "1".

Instead of the switching clutch C0, next, if the switching brake B0 is engaged to connect the differential-portion sun gear S0 to the casing 12, then, the power distributing mechanism 16 is placed in the locked state. Thus, the differential-portion sun gear S0 is placed in the non-rotating state under the non-differential state in which no differential action is initiated, causing the differential portion 11 to be placed in the non-differential state. Since the differential-portion ring gear R0 rotates at a speed higher than that of the differential-portion carrier CA0, the power distributing mechanism 16 functions as a speed-increasing mechanism. Thus, the differential portion 11 (power distributing mechanism 16) is placed in the fixed shifting state, i.e., the step-variable shifting state to perform a function as a speed-increasing transmission with the speed ratio $\gamma 0$ connected to a value smaller than "1", i.e., for example, about 0.7.

With the present embodiment, the switching clutch C0 and the switching brake B0 selectively place the shifting state of differential portion 11 (power distributing mechanism 16) in the differential state, i.e., the unlocked state and the non-differential state, i.e., the locked state. That is, the switching clutch C0 and the switching brake B0 serves as a differential state switching device that selectively switches the differential portion 11 (power distributing mechanism 16) in one of (i) the continuously variable shifting state, operative to perform the electrically and continuously controlled variable shifting operation, under which the differential portion 11 (power distributing mechanism 16) is placed in the differential state (coupled state) to perform the function as the electrically controlled differential device operative to function as the continuously variable transmission with, for instance, the shifting ratio is continuously variable; and (ii) the fixed shifting state under which the differential portion 11 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level.

In the locked state, the differential portion 11 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 11 (power distributing mechanism 16) operates as the transmission of the single-stage or the multi-stage with the speed ratio kept at a connected level.

The automatic shifting portion 20 corresponding to the shifting portion of the present invention is the shifting portion functioning as the step variable automatic transmission of which shifting ratio (=rotational speed $N_{18}$ of the power transmitting member 18/rotational speed $N_{OUT}$ of the output shaft 22) can be changed stepwise. It includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to be rotatable about its axis and about the axis of the first sun gear S1, and a first differential-portion ring gear R0 meshing with the first sun gear S1 via the first planetary gears P1, having a gear ratio ρ1 of, for instance, about "0.562".

The second planetary gear unit 28 includes a second sun gear S2, second planetary gears P2, a second carrier CA2 supporting the second planetary gears P2 to be rotatable about its axis and about the axis of the second sun gear S2, and a second ring gear R2 meshing with the second sun gear S2 via the second planetary gears P2, having for example a gear ratio ρ2 of about "0.425". The third planetary gear unit 30 includes a third sun gear S3, third planetary gears P3, a third carrier CA4 supporting the third planetary gears P3 to be rotatable about its axis and about the axis of the third sun gear S3, and the third ring gear R3 meshing with the third sun gear S3 through the third planetary gears P3, having a gear ratio ρ3 of about "0.421". With the first sun gear S, the first differential-portion ring gear R0, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios ρ1, ρ2 and ρ3 are represented by ZS1/ZR1, ZS2/ZR2, and ZS3/ZR3, respectively.

With the automatic shifting portion 20, the first sun gear S1 and the second sun gear S2 are integrally connected to each other and selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first differential-portion ring gear R0, the second carrier CA2 and the third carrier CA3 are integrally connected to each other and also connected to the output shaft 22. The second ring gear R2 and the third sun gear S3 are integrally connected to each other and selectively connected to the power transmitting member 18 through the first clutch C1.

Thus, the automatic shifting portion 20 and the power transmitting member 18 are selectively connected to each other through the first clutch C1 or the second clutch C2 used for establishing a gear shift position in the automatic shifting portion 20. In other words, the first clutch C1 and the second clutch C2 collectively function as an engaging device for switching the operations of the power-transmitting member 18 and the automatic shifting portion 20. That is, such an engaging device selectively switches a power transmitting path between the differential portion 11 (transmitting member 18) and the drive wheels 38 in a power transmitting state, enabling a power transfer through the power transmission path, and a power interrupting state interrupting the power transfer through the power transmission path. That is, with at least one of the first clutch C1 and the second clutch C2 being engaged, the power transmitting path is placed in the power transmitting state. In contrast, with both the first clutch C1 and the second clutch C2 being disengaged, the power transmitting path is placed in the power interrupting state.

The switching clutch C0, the first clutch C1, the second clutch C2, the switching brake B0, the first brake B1, the second brake B2 and the third brake B3 are hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

With the shifting mechanism 10 of such a structure, as indicated in an engagement operation Table shown FIG. 2, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neural position with a speed ratios γ (input-shaft rotation speed $N_{IN}$/output-shaft rotation speed $N_{OUT}$) varying in nearly equal ratio for each gear position. In particular, with the present embodiment, the power distributing mechanism 16 is comprised of the switching clutch C0 and the switching brake B0, either one of which is engaged in operation. This can cause the differential portion 11 to be placed in the continuously variable shifting state enabling the operation as the continuously variable transmission while establishing the fixed shifting state enabling the transmission to operate with the speed ratio maintained at a fixed level.

With either one of the switching clutch C0 and the switching brake. B0 being engaged in operation, accordingly, the differential portion 11 is placed in the fixed shifting state to cooperate with the automatic shifting portion 20 to allow the shifting mechanism 10 to operate as the step-variable transmission placed in the step-variable shifting state. With both of the switching clutch C0 and the switching brake B0 being disengaged in operation, the differential portion 11 is placed in the continuously variable shifting state to cooperate with the automatic shifting portion 20 to allow the shifting mechanism 10 to operate as the electrically controlled continuously variable transmission placed in the continuously variable shifting state. In other words, the shifting mechanism 10 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 11 is the transmission that can also be switched to the step-variable shifting state and the continuously variable shifting state.

For example, as shown in FIG. 2, under a circumstance where the shifting mechanism 10 is caused to function as the step-variable transmission, engaging the switching clutch C0, the first clutch C1 and the third brake B3 results in the 1st-speed gear position with the speed ratio γ1 having a maximum value of, for instance, about "3.357". Engaging the switching clutch C0, the first clutch C1 and the second brake B2 results in the 2nd-speed gear position with the speed ratio γ2 of, for instance, about "2.180", which is lower than that of the 1st-speed gear position. Engaging the switching clutch C0, the first clutch C1 and the first brake B1 results in the 3rd-speed gear position with the speed ratio γ3 of, for instance, about "1.424", which is lower than that of the 2nd-speed gear position. Engaging the switching clutch C0, the first clutch C1 and the second clutch C2 results in the 4th-speed gear position with the speed ratio θ4 of, for instance, about "1.000", which is lower than that of the 3rd-speed gear position.

With the first clutch C1, the second clutch C2 and the switching brake B0 being engaged, the 5th-speed gear position is established with the speed ratio γ5 of, for example, about "0.705", which is smaller than that of the 4th-speed gear position. With the second clutch C2 and the third brake B3 being engaged, further, the reverse-drive gear position is established with the speed ratio γR of, for example, about "3.209", which lies at a value between those of the 1st- and 2nd-speed gear positions. For the neutral "N" state to be established, for instance, all the clutches and the brakes C0, C1, C2, B0, B1, B2 and B3 are disengaged. In addition, the clutches and the brakes C1, C2, B1, B2 and B3, incorporated in the automatic shifting portion 20, serve as clutch engaging elements for enabling the connection or disconnection of the power transmitting path from the differential portion 11 to the drive wheels 38 and, hence, these component elements collectively correspond to power disconnecting means. Thus, it can be said that the automatic shifting portion 20 also functions as such power disconnecting means.

However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in an infinitely variable shifting ratio. Accordingly, a speed ratio can be continuously variable across the adjacent gear positions, making it possible for the shifting mechanism 10 as a whole to obtain an infinitely variable total speed ratio (overall speed ratio) γT.

Figure 3:
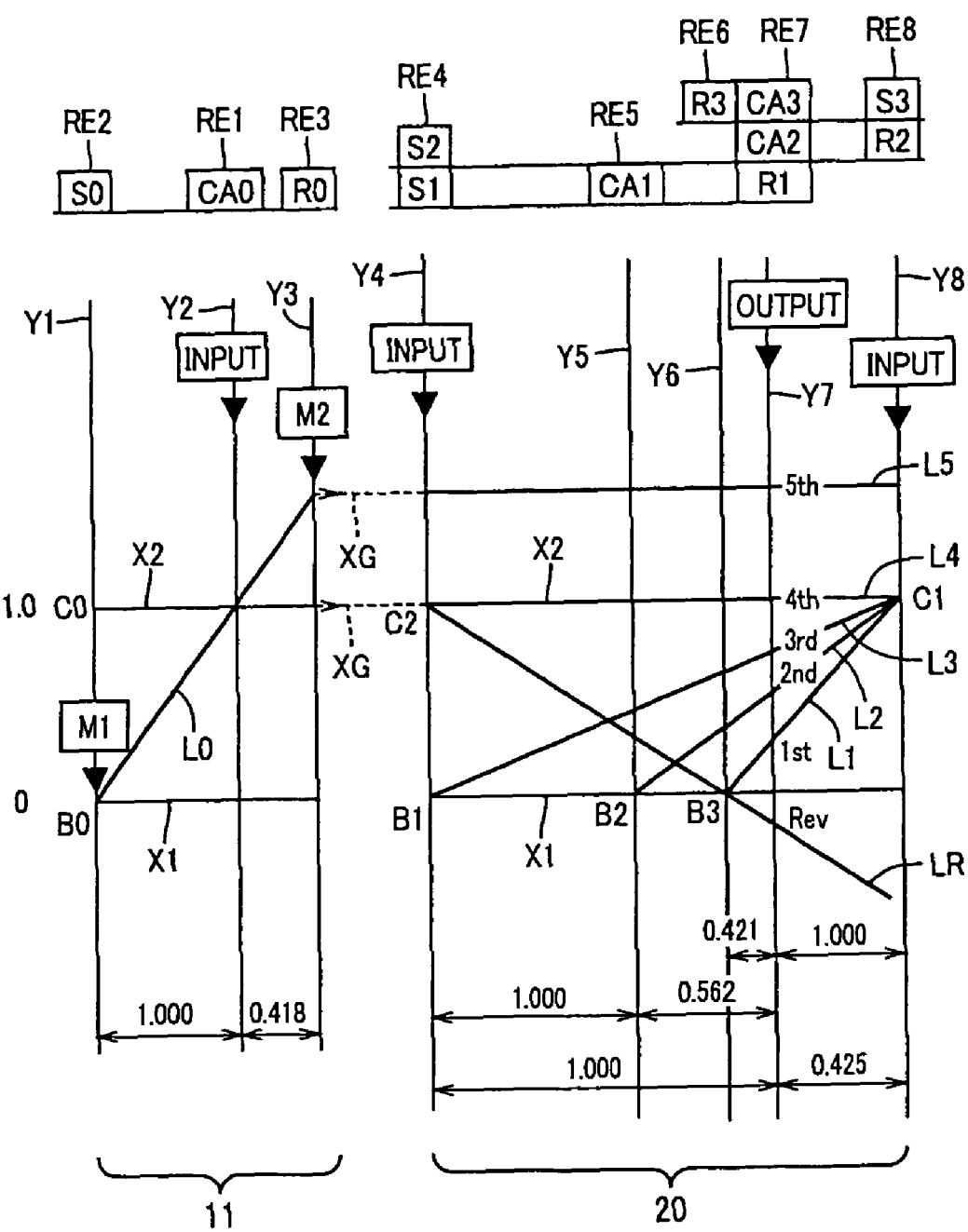
FIG. 3 is a collinear chart illustrating the relative rotation speed of rotary elements in each of different gear positions when the hybrid vehicle power transmitting apparatus shown in FIG. 1 is caused to operate in the step-variable shifting state.

FIG. 3 shows a collinear chart plotted in straight lines that can represent a correlation among the rotation speeds of the various rotary elements available to accomplish clutch engagement states in different modes depending on the gear positions of the shifting mechanism 10 comprised of the differential portion 11, functioning as the continuously variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the correlation among the gear ratios ρ established with the planetary gear units 24, 26, 28 and 30, and the vertical axis representing relative rotation speeds of the rotary elements. The lowermost line X1 of three horizontal lines indicates the rotation speed laying at a value of "0". An upper horizontal line X2 indicates the rotation speed laying at a value of "1.0", that is, a rotation speed $N_E$ of the engine 8 connected to the input shaft 14. The uppermost horizontal line XG indicates the rotation speed of the power transmitting member 18.

Starting from the left, three vertical lines Y1, Y2 and Y3, corresponding to the three elements forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio ρ0 of the differential-portion planetary gear unit 24.

Starting from the left, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier corresponding to a fifth rotary element (fifth element) RE5, the third ring gear R3 corresponding to a sixth rotary element (sixth element) RE6, the first differential-portion ring gear R0 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios ρ1, ρ2 and ρ3 of the first to third planetary gear units 26, 28 and 30.

The correlation between the vertical lines on the collinear chart, if an interval between the sun gear and the carrier is assigned to a distance corresponding to a value of "1", an interval between the carrier and the ring gear is assigned to a distance corresponding to the gear ratio ρ of the planetary gear unit. That is, for the differential portion 11, an interval between the vertical lines Y1 and Y2 is assigned to a distance corresponding to a value of "1" and an interval between the vertical lines Y2 and Y3 is assigned to a distance corresponding to a value of "ρ". For each of the first to third planetary gear units 26, 28 and 30 of the automatic shifting portion 20, further, an interval between the sun gear and the carrier is assigned to a distance corresponding to a value of "1" and an interval between the carrier and the ring gear is assigned to a distance corresponding to the gear ratio ρ.

Expressing the structure using the collinear chart shown in FIG. 3, the shifting mechanism 10 of the present embodiment takes the form of a structure including the power distributing mechanism 16 (continuously variable shifting portion 11). With the power distributing mechanism 16, the differential-portion planetary gear unit 24 has the first rotary element RE1 (differential-portion carrier CA0) connected to the input shaft 14, i.e., the engine 8, while selectively connected to the second rotary element RE2 (differential-portion sun gear S0) through the switching clutch C0, the second rotary element RE2 connected to the first electric motor M1 while selectively connected to the casing 12 through the switching brake B0, and the third rotary element RE3 (differential-portion ring gear R0) connected to the power transmitting member 18 and the second electric motor M2. Thus, the rotation of the input shaft 14 is transmitted (input) to the automatic shifting portion (step-variable shifting portion) 20 through the power transmitting member 18. An inclined straight line L0, passing across an intersecting point between the lines Y2 and X2, represents the correlation between the rotation speeds of the differential-portion sun gear S0 and the differential-portion ring gear R0.

For example, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the straight line L0 and the vertical line Y1, to increase or decrease. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease.

With the switching clutch C0 being engaged to couple the differential-portion sun gear S0 and the differential-portion carrier CA0 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed $N_E$. In contrast, with the switching brake B0 being engaged to halt the rotation of the differential-portion sun gear S0, the power distributing mechanism 16 is brought into the non-differential state to function as the speed increasing mechanism. Thus, the straight line L0 describes a state as shown in FIG. 3, under which the rotation of the differential-portion ring gear R0, i.e., the power transmitting member 18, represented by an intersecting point between the straight line L0 and the vertical line Y3, is input to the automatic shifting portion 20 at a rotation speed higher than the engine rotation speed $N_E$.

With the automatic shifting portion 20, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output shaft 22 and the eighth rotary element RE8 is selectively connected to the power transmitting member 18 through the first clutch C1.

As shown in FIG. 3, with the automatic shifting portion 20, upon engagement of the first clutch C1 and the third brake B3, the rotation speed of the output shaft 22 for the 1st-speed gear position is represented by an intersecting point between the inclined straight line L1 and the vertical line Y7 representing the rotation speed of the seventh rotary element RE7 connected to the output shaft 22. Here, the inclined straight line L1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1.

Similarly, the rotation speed of the output shaft 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined upon engagement of the first clutch C1 and the first brake B1, and the vertical line Y7 indicative of the rotation speed of the seventh rotary element RE7 connected to the output shaft 22. The rotation speed of the output shaft 22 for the 4th-speed gear position is represented by an intersecting point between a horizontal line L4, determined upon engagement of the first and second clutches C1 and C2, and the vertical line Y7 indicative of the rotation speed of the seventh rotary element RE7 connected to the output shaft 22.

For the 1st-speed to 4th-speed gear positions, the switching clutch C0 remains engaged. Therefore, a drive force is applied from the differential portion 11, i.e., the power distributing mechanism 16 to the eighth rotary element RE8 at the same rotation speed as that of the engine rotation speed $N_E$. However, in place of the switching clutch C0, if the switching clutch B0 is engaged, then, the drive force is applied from the differential portion 11 to the eighth rotary element RE8 at a higher rotation speed than the engine rotation speed $N_E$. Thus, an intersecting point between a horizontal line L5 and the vertical line Y7 represents the rotation speed of the output shaft 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output shaft 22.

Figure 4:
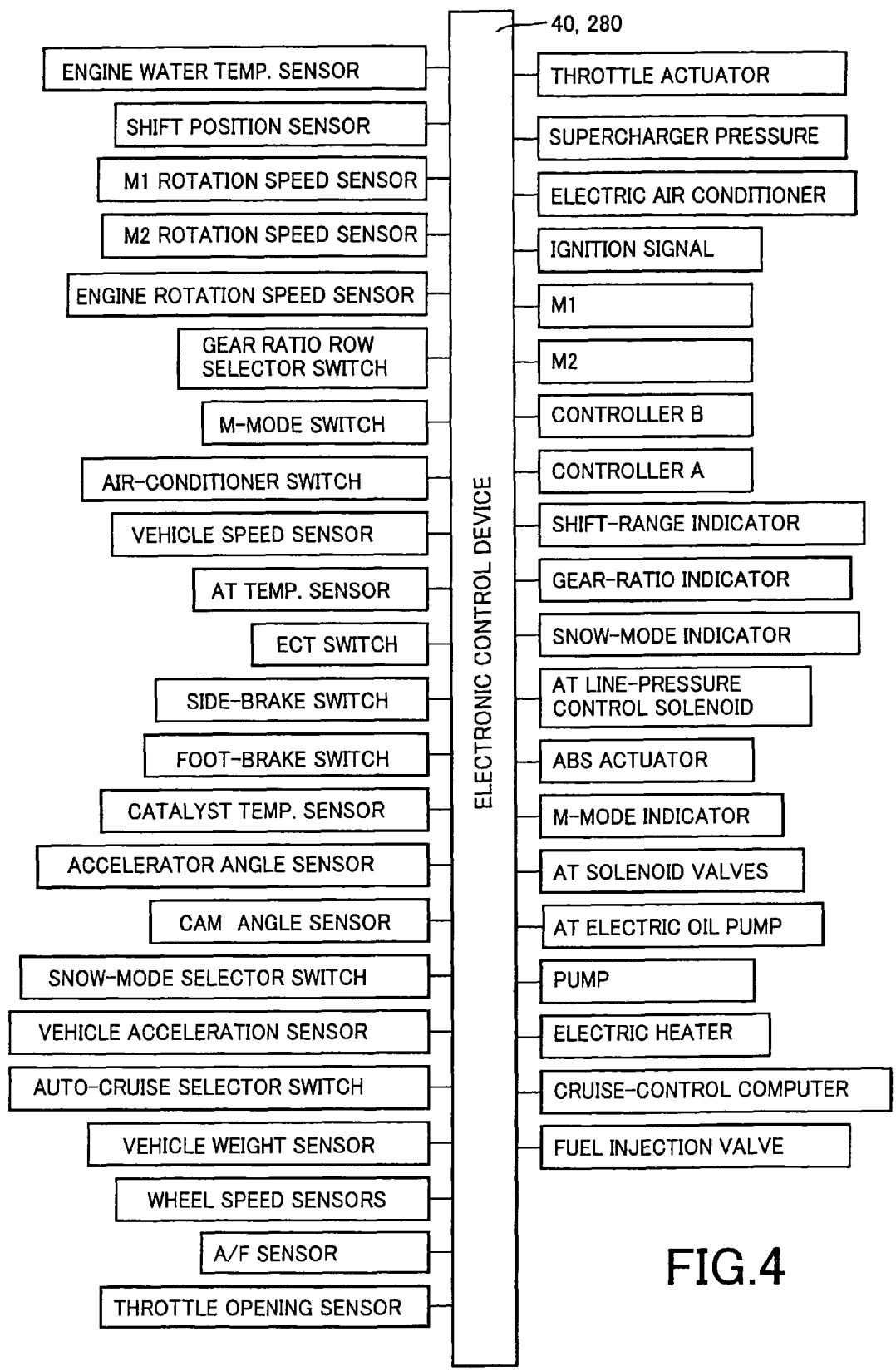
FIG. 4 is a view illustrating input and output signals to be input,to or output from an electronic control device incorporated in the hybrid vehicle power transmitting apparatus shown in FIG. 1.

FIG. 4 exemplarily shows various input signals applied to an electronic control device 40, serving as a control device for controlling the shifting mechanism 10 forming part of the hybrid vehicle power transmitting apparatus according to the present invention, and various output signals delivered from the electronic control device 40. The electronic control device 40 includes a so-called microcomputer incorporating a CPU, a ROM, a RAM and an input/output interface. With the microcomputer operated to perform signal processing according to programs preliminarily stored in the ROM while utilizing a temporary data storage function of the ROM, hybrid drive controls are conducted to control the engine 8 and the first and second electric motors M1 and M2, while executing drive controls such as shifting controls of the automatic shifting portion 20.

The electronic control device 40 is applied with the various input signals from various sensors and switches shown in FIG. 4. These input signals include a signal indicative of an engine cooling water temperature $TEMP_W$, a signal indicative of a selected shift position $P_{SH}$, a signal indicative of a rotation speed $N_{M1}$ (hereinafter, referred to as a "first-motor rotation speed $N_{M1}$") of the first electric motor M1, a signal indicative of a rotation speed $N_{M2}$ (hereinafter, referred to as a "second-motor rotation speed $N_{M2}$") of the second electric motor M2, a signal indicative of the engine rotation speed $N_E$ representing the rotation speed of the engine 8, a signal indicative of a set value of gear ratio row, a signal commanding an "M" mode (manually shift drive mode), and an air-conditioning signal indicative of the operation of an air conditioner, etc.

Besides the input signals described above, the electronic control device 40 is further applied with other various input signals. These input signals include a signal indicative of the vehicle speed V corresponding to the rotation speed $N_{OUT}$ of the output shaft 22, a working oil temperature signal indicative of a working oil temperature of the automatic shifting portion 20, a signal indicative of a side brake being operated, a signal indicative of a foot brake being operated, a catalyst temperature signal indicative of a catalyst temperature, an accelerator opening signal indicative of a displacement value $A_{CC}$ of an accelerator pedal corresponding to an output demand value required by a driver, a cam angle signal, a snow mode setting signal indicative of a snow mode being set, an acceleration signal indicative of a fore and aft acceleration of the vehicle, an auto-cruising signal indicative of the vehicle running under an auto-cruising mode, a vehicle weight signal indicative of a weight of the vehicle, a drive wheel velocity signal indicative of a wheel velocity of each drive wheel, a signal indicative of an air-fuel ratio A/F of the engine 8, and a signal indicative of a throttle valve opening $\theta_{TH}$, etc.

The electronic control device 40 generates various control signals to be applied to an engine output control device 43 (refer to FIG. 6) for controlling the engine output. These control signals include, for instance, a drive signal applied to a throttle actuator 97 for controlling an opening degree $\theta_{TH}$ of a throttle valve 96 disposed in an intake manifold 95 of the engine 8, a fuel supply quantity signal to be applied to a fuel injection device 98 for controlling the amount to fuel to be supplied to each cylinder of the engine 8, an ignition signal to be applied to an ignition device 99 for commanding an ignition timing of the engine 8, a supercharger pressure regulating signal for adjusting a supercharger pressure level, an electric air-conditioner drive signal for actuating an electric air conditioner, and command signals for commanding the operations of the first and second electric motors M1 and M2.

Besides the control signals described above, the electronic control device 40 generates various output signals. These output signals include a shift-position (selected operating position) display signal for activating a shift indicator, a gear-ratio display signal for providing a display of the gear ratio, a snow-mode display signal for providing a display of a snow mode under operation, an ABS actuation signal for actuating an ABS actuator for preventing slippages of the drive wheels during a braking effect, an M-mode display signal for displaying the M-mode being selected, valve command signals for actuating electromagnet valves incorporated in a hydraulically operated control circuit 42 (see FIG. 6) to control the hydraulic actuators of the hydraulically operated frictional engaging devices of the differential portion 11 and the automatic shifting portion 20, drive command signals for actuating a hydraulic pressure pump serving as a hydraulic pressure source of the hydraulically operated control circuit 42, a signal for driving an electric heater, and signals applied to a cruise-control computer, etc.

Figure 5:
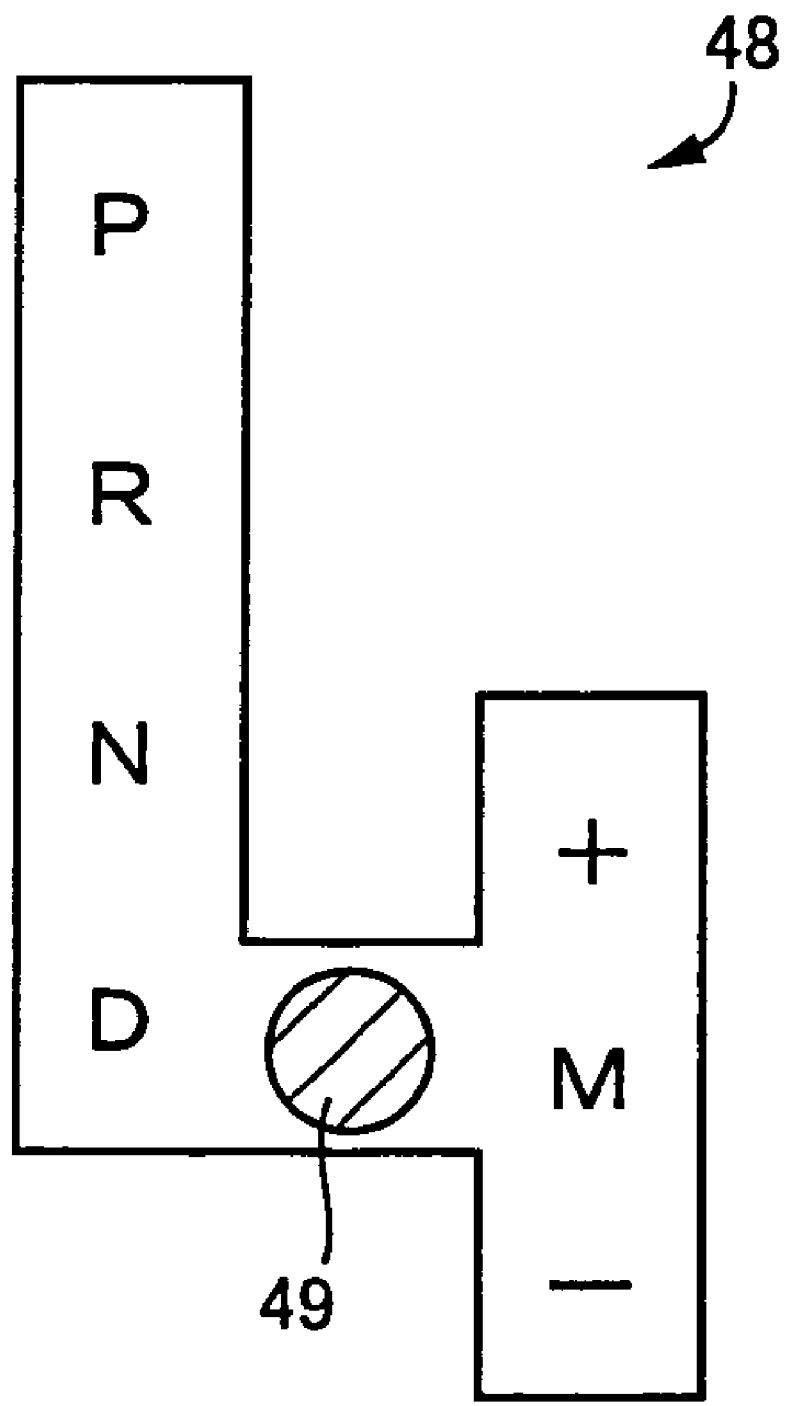
FIG. 5 is a view showing one sample of a shift operating device provided with a shift lever for operating to select one of plural kinds of shift positions.

FIG. 5 is a view showing one sample of a shift operating device 48, serving as a switching device, which is manually operated to select one of the shift positions $P_{SH}$ of multiple kinds. The shift operating device 48 includes a shift lever 49 mounted aside, for example, a driver's seat to be manually operated to select one of the shifting positions of the plural kinds.

The shift lever 49 has a structure arranged to be selectively shifted in manual operation to be set to one of a parking position "P" (Parking) under which the shifting mechanism 10, i.e., the automatic shifting portion 20, is placed in the neutral state interrupting the power transmitting path of the shifting mechanism 10, i.e., the automatic shifting portion 20, a reverse drive running position "R" (Reverse) for the vehicle to run in a reverse drive mode, a neutral position "N" (Neutral) for the neutral state to be established under which the power transmitting path of the shifting mechanism 10 is interrupted, a forward drive automatic shift position "D" (Drive) for an automatic shift control to be executed within a varying range of the total speed ratio γT that can be shifted with the shifting mechanism 10, and a forward drive manual shift position "M" (Manual) under which a manual shift running mode (manual mode) is established to set a so-called shift range that limits the shift gear positions in a high speed range during the execution of the automatic shift control.

In conjunction with the shift lever 49 being manually operated to each of the shift positions $P_{SH}$, for instance, the hydraulic control circuit 42 is electrically switched in such a way to establish each of the gear shift positions such as the reverse drive position "R", the neutral position "N" and the forward drive position "D" as shown in the engagement operation table shown in FIG. 2.

Among the various shift positions $P_{SH}$ covering "P" to "M" positions, the "P" and "N" positions represent the non-running positions selected when no intension is present to run the vehicle. For the "P" and "N" positions to be selected, both the first and second clutches C1 and C2 are disengaged, as shown in, for example, the engagement operation table of FIG. 2, and non-drive positions are selected to place the power transmitting path in the power cutoff state. This causes the power transmitting path of the automatic shifting portion 20 to be interrupted, disenabling the vehicle to be driven.

The "R", "D" and "M" positions represent running positions selected when the vehicle is caused to run. These shift positions also represent drive positions selected when switching the power transmitting path to the power transmitting state under which at least one of the first and second clutches C1 and C2 is engaged as shown in, for instance, the engagement operation table of FIG. 2. With such shifting positions selected, the power transmitting path of the automatic shifting portion 20 is connected to enable the vehicle to be driven.

More particularly, with the shift lever 49 manually operated from the "P" position or the "N" position to the "R" position, the second clutch C2 is engaged so that the power transmitting path of the automatic shifting portion 20 is switched from the power cutoff state to the power transmitting state. With the shift lever 49 manually operated from the "N" position to the "D" position, at least the first clutch C1 is engaged, causing the power transmitting path of the automatic shifting portion 20 to be switched from the power cutoff state to the power transmitting state.

With the shift lever 49 manually operated from the "R" position to the "P" position or the "N" position, the second clutch C2 is disengaged, causing the power transmitting path of the automatic shifting portion 20 to be switched from the power transmitting state to the power cutoff state. With the shift lever 49 manually operated from the "D" position to the "N" position, the first and second clutches C1 and C2 are disengaged, causing the power transmitting path of the automatic shifting portion 20 to be switched from the power transmitting state to the power cutoff state.

Figure 7:
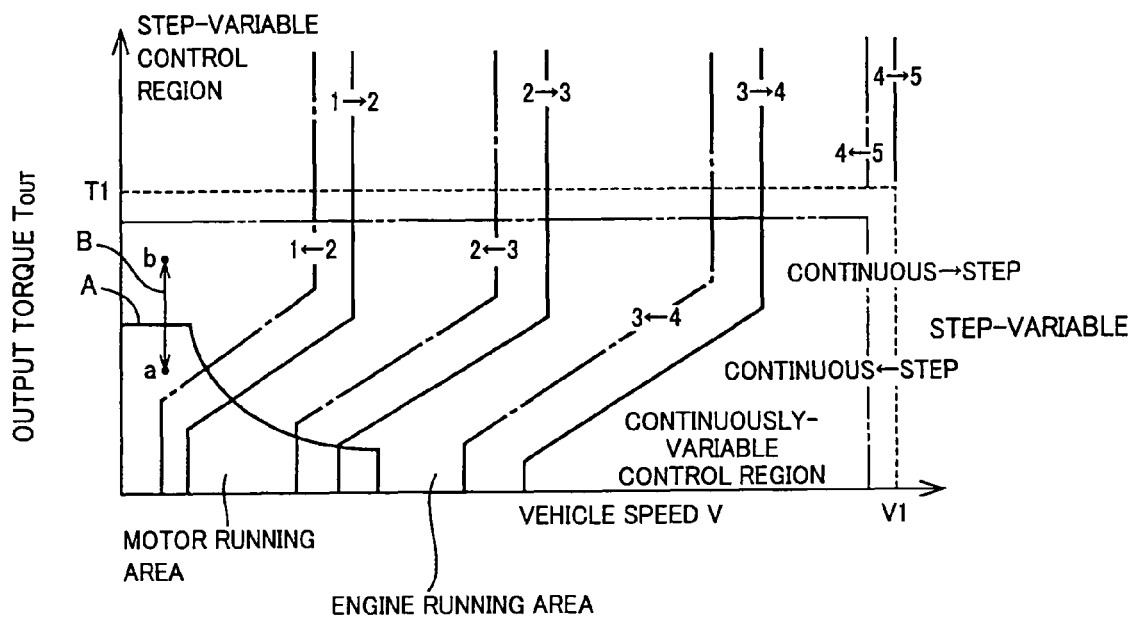
FIG. 7 is a view representing one example of a preliminarily stored shifting diagram based on which the shifting of an automatic shifting portion is determined, one example of a preliminarily stored shifting diagram based on which switching of the shifting state of switching mechanism is determined, and one example of a preliminarily stored drive-force source switching diagram having a boundary line between an engine drive region and a motor drive region based on which an engine drive mode and a motor drive mode is switched, plotted on a two-dimensional coordinate in terms of parameters including a vehicle speed and output torque.

FIG. 6 is a functional block diagram illustrating an essential part of a control function to be performed with the electronic control device 40. In FIG. 6, step-variable shifting control means 54 functions as shifting control means for the shifting the shifting the automatic shifting portion 20. For instance, the step-variable shifting control means 54 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 56, which are plotted in solid lines and single dot lines as shown in FIG. 7. That is, the step-variable shifting control means 54 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting output command) to the hydraulic control circuit 42 for engaging and/or disengaging the hydraulically operated frictional engaging devices, excepting the switching clutch C0 and the switching brake B0, so as to achieve a desired shifting position in accordance with, for instance, the engagement operation table shown in FIG. 2.

Hybrid control means 52 renders the engine 8 operative in an operating region at high efficiency under the infinitely variable shifting state of the shifting mechanism 10, i.e., the differential state of the differential portion 11. At the same time, the hybrid control means 52 causes the engine 8 and the second electric motor M2 to deliver drive forces at varying distributing rates while causing the first electric motor M1 to generate electric power at a varying rate for a reactive force to be generated at an optimum value, thereby controlling the speed ratio γ0 of the differential portion 11 placed in the electrically controlled continuously variable transmission. For instance, during the running of the vehicle at a current vehicle speed, the hybrid control means 52 calculates a target (demanded) output of the vehicle by referring to the displacement value Acc of the accelerator pedal and the vehicle speed V that collectively represents the output demanded value intended by the driver. Then, the hybrid control means 52 calculates a demanded total target output based on the target output and a charging request value of the vehicle. In order to obtain the total target output, the hybrid control means 52 calculates a target engine output with taking account of the transmitting a loss, loads on auxiliary units and assisting torque of the second electric motor M2, etc.

Then, the hybrid control means 52 controls the engine 8 so as to provide the engine rotation speed $N_E$ and engine torque $T_E$ such that the target engine output is obtained, while controlling the first electric motor M1 to generate electric power at a proper power rate.

The hybrid control means 52 executes a hybrid control with taking account of the gear position of the automatic shifting portion 20 so as to obtain power performance and improved fuel consumption. During such a hybrid control, the differential portion 11 is rendered operative to function as the electrically controlled continuously variable transmission for the purpose of matching the engine rotation speed $N_E$, determined for the engine 8 to operate at a high efficiency, to the rotation speed of the power transmitting member 18 determined based on the vehicle speed V and the selected gear position of the automatic shifting portion 20. To this end, the hybrid control means 52 preliminarily stores therein an optimum fuel economy curve (including a fuel economy map and relevant relationship) of the engine 8 preliminarily determined on an experimental basis such that, during the running of the vehicle under the continuously variable shifting state, the vehicle has drivability and fuel economy performance in compatibility on a two-dimensional coordinate with parameters including, for instance, the engine rotation speed $N_E$ and output torque (engine torque) $T_E$ of the engine 8.

In order to cause the engine 8 to operate on such an optimum fuel economy curve, a target value on the total speed ratio γT of the shifting mechanism 10 is determined so as to obtain engine torque $T_E$ and the engine rotation speed $N_E$ for the demanded engine output to be generated so as to satisfy, for instance, the target output (total target output and demanded drive force). To achieve such a target value, the hybrid control means 52 controls the-speed ratio γ0 of the differential portion 11, while controlling the total speed ratio γT within a variable shifting range at a value, for instance, ranging from 13 to 0.5.

During such hybrid control, the hybrid control means 52 allows electric energy generated by the first electric motor M1 to be supplied to a battery 60 and the second electric motor M2 through an inverter 58. This allows a major part of the drive force delivered from the engine 8 to be mechanically transmitted to the power transmitting member 18 and the rest of the drive force of the engine is delivered to the first electric motor M1 to be consumed thereby for conversion to electric power. The resulting electric energy is supplied through the inverter 58 to the second electric motor M2, which in turn is driven to provide a drive force for delivery to the power transmitting member 18. Equipments, involved in the operation of generating electric energy and the operation causing the second electric motor M2 to consume electric energy, establish an electric path in which the part of the drive force, delivered from the engine 8, is converted to electric energy which in turn is converted into mechanical energy.

The hybrid control means 52 functionally includes engine output control means for executing an output control of the engine 8 so as to provide the demanded engine output. The engine output control means allows the throttle actuator 97 to perform a throttle control so as to controllably open or close the electronic throttle valve 96. In addition, the engine output control means outputs commands to the engine output control device 43 so as to cause the fuel injection device 98 to control the fuel injection quantity and fuel injection timing for performing a fuel injection control while permitting the ignition device 99, such as an igniter or the like, to control an ignition timing for an ignition timing control. These commands are output in a single mode or a combined mode. For instance, the hybrid control means 52 drives the throttle actuator 97 in response to the acceleration opening signal Acc by fundamentally referring to the preliminarily stored relationship, not shown, so as to execute the throttle control such that the greater the accelerator opening Acc, the greater will be the throttle valve opening $\theta_{TH}$.

A solid line A, shown in FIG. 7, represents a boundary line between an engine drive region and a motor drive region for the engine 8 and an electric motor, i.e., for instance, the second electric motor M2 to be selectively switched as a drive force source for the vehicle to perform a startup/running (hereinafter referred to as "running"). In other words, the boundary line is used for switching a so-called engine drive mode, in which the engine 8 is caused to act as a running drive force source for starting up/running (hereinafter referred to as "running") the vehicle, and a so-called motor drive mode in which the second electric motor M2 is caused to act as a drive force source for running the vehicle. The preliminarily stored relationship, having the boundary line (in the solid line A) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive force correlation value. Memory means 56 preliminarily stores such a drive-force source switching diagram together with the shifting diagram (shifting map) designated by, for instance, the solid line and the single dot line in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$, i.e., low engine torque $T_E$, at which an engine efficiency is generally regarded to be lower than that involved a high torque region, or a relatively low vehicle speed range of the vehicle speed V, i.e., under a low load region as will be apparent from FIG. 7.

During such a motor drive mode, the hybrid control means 52 renders the differential portion 11 operative to perform an electrical CVT function (differential function) for controlling the first-motor rotation speed NM1 at a negative rotation speed, i.e., at an idling speed to maintain the engine rotation speed $N_E$ at a zeroed or nearly zeroed level, thereby minimizing a drag of the engine 8, remained under a halted state, for providing improved fuel economy.

The hybrid control means 52 includes engine-startup stop control means 66 that switches an operating state of the engine 8 between a drive state and a stop state to select one of the engine drive mode and the motor drive mode. As used herein, the term "switches" refers to an operation in which the engine 8 is started up or stopped in operation. With the hybrid control means 52 executed the operation based on the vehicle condition by referring to, for instance, the drive-force source switching diagram shown in FIG. 7 to determine that the motor drive mode and the engine drive mode need to be switched, the engine-startup stop control means 66 executes the operation to start up or stop the engine 8.

If the accelerator pedal is depressed in operation to cause an increase in demanded engine output torque $T_{OUT}$, the vehicle condition varies from the motor drive region to the engine drive region as shown by a transition in points "a"→"b" on a solid line B in FIG. 7. When this takes place, the engine-startup stop control means 66 turns on the first electric motor M1 to raise the first-motor rotation speed $N_{M1}$. That is, the first electric motor M1 is rendered operative to function as a starter. This allows the engine 8 to start up with an increase in the engine rotation speed $N_E$. During such operation, the engine-startup stop control means 66 causes the ignition device 99 to initiate an ignition at a given engine rotation speed $N_E'$, i.e., for instance, at an engine rotation speed $N_E$ enabling an autonomous rotation, after which the hybrid control means 52 switches the motor drive mode to the engine drive mode.

During such operation, the engine-startup stop control means 66 may cause the first-motor rotation speed $N_{M1}$ to immediately raise for increasing the engine rotation speed $N_E$ up to the given engine rotation speed $N_E'$. This can immediately avoid the occurrence of a resonating region from an engine rotating speed region remaining below an idling rotation speed $N_{IDLE}$ that is well known, thereby suppressing the possibility of the engine 8 vibrating at startup thereof.

If the accelerator pedal is released with a decrease in demanded engine output torque $T_{OUT}$, the vehicle condition varies from the engine drive region to the motor drive region as shown by another transition in points "b"→"a" on the solid line B in FIG. 7. When this takes place, the engine-startup stop control means 66 causes the fuel injection device 98 to interrupt the supply of fuel to the engine 8. That is, a fuel cutoff operation is executed to stop the engine 8. In such a way, the hybrid control means 52 switches the engine drive mode to the motor drive mode. During such an operation, the engine-startup stop control means 66 may execute the operation to immediately lower the first-motor rotation speed $N_{M1}$ for immediately lowering the engine rotation speed $N_E$ to a zeroed or nearly zeroed level. This immediately avoids the engine 8 from entering the resonating region, thereby suppressing the possibility of the engine 8 vibrating at startup thereof. In an alternative, the engine-startup stop control means 66 may execute the operation to stop the engine 8 upon executing an operation to lower the first-motor rotation speed $N_{M1}$ to decrease the engine rotation speed $N_E$ on a stage prior to the fuel cutoff operation being executed for effectuating the fuel cutoff operation at the given engine rotation speed $N_E'$.

Further, even under the engine drive region, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and the motor drive mode in combination.

Further, the hybrid control means 52 can cause the differential portion 11 to perform the electrical CVT function through which the engine 8 can be maintained under the operating state regardless of the vehicle left in a halted condition or a low speed condition. For instance, if a drop occurs in a state of charge SOC of the battery 60 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 52 executes the operation to cause the differential portion 11 to perform the electrical CVT function for controlling the first-motor rotation speed $N_{M1}$ and the second-motor rotation speed $N_{M2}$ to maintain the engine rotation speed $N_E$ at an arbitrary level regardless of the vehicle remaining under the halted or running state. As will be understood from the collinear chart shown in FIG. 3, for instance, when raising the engine rotation speed $N_E$, the hybrid control means 52 executes the operation to maintain the second-motor rotation speed $N_{M2}$, bound with the vehicle speed V, at a nearly fixed level while raising the first-motor rotation speed $N_{M1}$.

In placing the shifting mechanism 10 in the step-variable shifting state, increasing-speed gear-position determining means 62 determines which of the switching clutch C0 and the switching brake B0 is to be engaged. To this end, the increasing-speed gear-position determining means 62 executes the operation based on, for instance, the vehicle condition according to the shifting diagram, shown in FIG. 7, which is preliminarily stored in the memory means 56, to determine whether or not a gear position to be shifted in the shifting mechanism 10 is an increasing-speed gear position, i.e., for instance, a 5th-speed gear position.

Switching control means 50 switches the engaging and/disengaging states of the differential-state switching means (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$, by referring to the relationships (shifting diagram and shifting map), preliminarily stored in the memory means 56, which are shown in the broken line and the double dot line in FIG. 7, thereby determining whether to switch the shifting state of the shifting mechanism 10 (differential portion 11). That is, the operation is executed to determine whether there exist a continuously variable shifting control region for the shifting mechanism 10 to be placed in the continuously variable shifting state or a step-variable shifting control region for the shifting mechanism 10 to be placed in the step-variable shifting state. This allows the operation to be executed for determining the shifting state to be switched in the shifting mechanism 10, thereby executing the operation to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disenabling or interrupting the hybrid control or the continuously variable shifting control, while permitting the step-variable shifting control means 54 to perform the shifting for the step-variable shifting operation that has been preliminarily determined. When this takes place, the step-variable shifting control means 54 allows the automatic shifting portion 20 to perform the automatic shifting in accordance with, for instance, the shifting diagram shown in FIG. 7 and preliminarily stored in the memory means 56. For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear positions according to the engagement operation table shown in FIG. 2.

For instance, if the increasing-speed gear-position determining means 62 determines that the 5th-gear position is to be selected, the shifting mechanism 10 as a whole can obtain a so-called overdrive-gear position on an increasing-speed gear position with a speed ratio less than "1.0" as a whole. To this end, the switching control means 50 outputs a command to the hydraulic control circuit 42 for disengaging the switching clutch C0 and engaging the switching brake B0 to allow the differential portion 11 to function as an auxiliary power transmission with a fixed speed ratio γ0, i.e., for instance, the speed ratio γ0 equal to "0.7".

If the increasing-speed gear-position determining means 62 determines that no 5th-gear position is to be selected, the shifting mechanism 10 as a whole can obtain a decreasing-speed gear position with a speed ratio of "1.0" or more. To this end, the switching control means 50 outputs another command to the hydraulic control circuit 42 for engaging the switching clutch C0 and disengaging the switching brake B0 to allow the differential portion 11 to function as the auxiliary power transmission with the fixed speed ratio γ0, i.e., for instance, the speed ratio γ0 equal to "1". Thus, the switching control means 50 causes the shifting mechanism 10 to be switched in the step-variable shifting state under which the operation is executed to selectively switch the gear positions of two kinds to either one gear position. With the differential portion 11 rendered operative to function as the auxiliary power transmission while the automatic shifting portion 20, connected to the differential portion 11 in series, is rendered operative to function as the step-variable transmission, the shifting mechanism 10 as a whole is rendered operative to function as the so-called step-variable automatic transmission.

On the contrary, if the switching control means 50 determines that the shifting mechanism 10 remains in the continuously variable shifting control region to be switched in the continuously variable shifting state, the shifting mechanism 10 as a whole can obtain the continuously variable shifting state. To this end, the switching control means 50 outputs a command to the hydraulic control circuit 42 for disengaging both the switching clutch C0 and the switching brake B0 so as to place the differential portion 11 in the continuously variable shifting state to enable an infinitely variable shifting operation to be executed. Simultaneously, the switching control means 50 outputs a signal to the hybrid control means 52 for permitting the hybrid control to be executed, while outputting a given signal to the step-variable shifting control means 54. As used herein, the term "given signal" refers to a signal, by which the shifting mechanism 10 is fixed to a gear position for a predetermined continuously variable shifting state, or a signal for permitting the automatic shifting portion 20 to perform the automatic shifting according to, for instance, the shifting diagram, shown in FIG. 7, which is preliminarily stored in the memory means 56. In this case, the step-variable shifting control means 54 performs the automatic shifting upon executing the operation, excepting the operations to engage the switching clutch C0 and the switching brake B0 in the engagement operation table shown in FIG. 2.

This causes the switching control means 50 to switch the differential portion 11 to the continuously variable shifting state to function as the continuously variable transmission, while rendering the automatic shifting portion 20, connected to the differential portion 11 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in infinitely variable speed ratio ranges. Accordingly, since the speed ratio is continuously variable across the adjacent gear positions, the shifting mechanism 10 as a whole can obtain the overall speed ratio γT in an infinitely variable mode.

Now, FIG. 7 will be described more in detail. FIG. 7 is a view showing the relationships (shifting diagram and shifting map), preliminarily stored in the memory means 56, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 7, the solid lines represent upshift lines and single dot lines represent downshift lines.

In FIG. 7, the broken lines represent a determining vehicle speed V1 and a determining output torque T1 for the switching control means 50 to determine the step-variable control region and the continuously variable control region. That is, the broken lines represent a high vehicle-speed determining line, forming a series of a determining vehicle speed V1 representing a predetermined high-speed drive determining line for determining a high speed running state of a hybrid vehicle, and a high-output drive determining line, forming a series of determining output torque T1 representing a predetermined high-output drive determining line for determining the drive force correlation value related to the drive force of the hybrid vehicle. As used herein, the term "drive force correlation value" refers to determining output torque T1 that is preset for determining a high output drive for the automatic shifting portion 20 to provide output torque at a high output. A hysteresis is provided for determining the step-variable control region and the continuously variable control region as indicated by a double dot line in FIG. 7 in contrast to the broken line.

That is, FIG. 7 represents a shifting diagram (switching map and relationship), preliminarily stored in terms of the parameters including the vehicle speed V, including the determining vehicle speed V1 and determining output torque T1, and output torque $T_{OUT}$, based on which the switching control means 50 executes the determination on a region as to which of the step-variable control region and the continuously variable control region belongs to the shifting mechanism 10. The memory means 56 may preliminarily store the shifting map, inclusive of such a shifting diagram. Moreover, the shifting diagram may be of the type that includes at least one of the determining vehicle speed V1 and determining output torque T1 and may include a preliminarily stored shifting diagram with a parameter taking any of the vehicle speed V and output torque $T_{OUT}$.

The shifting diagram, the switching diagram or the drive-force source switching diagram or the like may be stored not in the map but in a determining formula for making comparison between a current vehicle speed V and a determining vehicle speed V1, and another determining formula or the like for making comparison between output torque $T_{OUT}$ and determining output torque T1. In this case, the switching control means 50 places the shifting mechanism 10 in the step-variable shifting state when the vehicle condition such as, for instance, an actual vehicle speed exceeds the determining vehicle speed V1. In addition, the switching control means 50 places the shifting mechanism 10 in the step-variable shifting state when the vehicle condition such as, for instance, output torque $T_{OUT}$ of the automatic shifting portion 20 exceeds determining output torque T1.

When a malfunction or functional deterioration occurs in electrical control equipment such as an electric motor or the like used for rendering the differential portion 11 operative as the electrically controlled continuously variable transmission, the switching control means 50 may be configured to place the shifting mechanism 10 in the step-variable shifting state on a priority basis for the purpose of ensuring the running of the vehicle to even if the shifting mechanism 10 remains in the continuously variable control region. As used herein, the term "malfunction or functional deterioration in electrical control equipment" refers to a vehicle condition in which: functional degradation occurs in equipment related to the electrical path involved in the operation of the first electric motor M1 to generate electric energy and the operation executed in converting such electric energy to mechanical energy; that is, failures or functional deteriorations, caused by a breakdown or low temperature, occur in the first electric motor M1, the second electric motor M2, the inverter 58, the battery 60 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 38 but also: output torque $T_{OUT}$ of the automatic shifting portion 20; engine output torque $T_E$; an acceleration value of the vehicle; an actual value such as engine output torque $T_E$ calculated based on, for instance, the accelerator operating or the throttle valve opening $\theta_{TH}$ (or an intake air quantity, an air/fuel ratio or a fuel injection amount) and the engine rotation speed $N_E$; or an estimated value such as engine output torque $T_E$ or demanded vehicle drive force calculated based on a displacement value of the accelerator pedal actuated by the driver or the throttle valve operating or the like. In addition, the drive torque may be calculated upon taking a differential ratio and a radius of each drive wheel 38 into consideration by referring to output torque $T_{OUT}$ or the like or may be directly detected using a torque sensor or the like. This is true for each of other torques mentioned above.

For instance, the operation of the shifting mechanism 10 under the continuously variable shifting state during the running of the vehicle at the high speed turns out a consequence of deterioration in fuel economy. The determining vehicle speed V1 is determined to a value that can render the shifting mechanism 10 operative in the step-variable shifting state during the running of the vehicle at the high speed so as to address such an issue. Further, determining torque T1 is determined to a value that prevents reactive torque of the first electric motor M1 from covering a high output region of the engine during the running of the vehicle at a high output. That is, determining torque T1 is determined to such a value depending on, for instance, a characteristic of the first electric motor M1 that is possibly mounted with a reduced maximum output in electric energy for miniaturizing the first electric motor M1.

Figure 8:
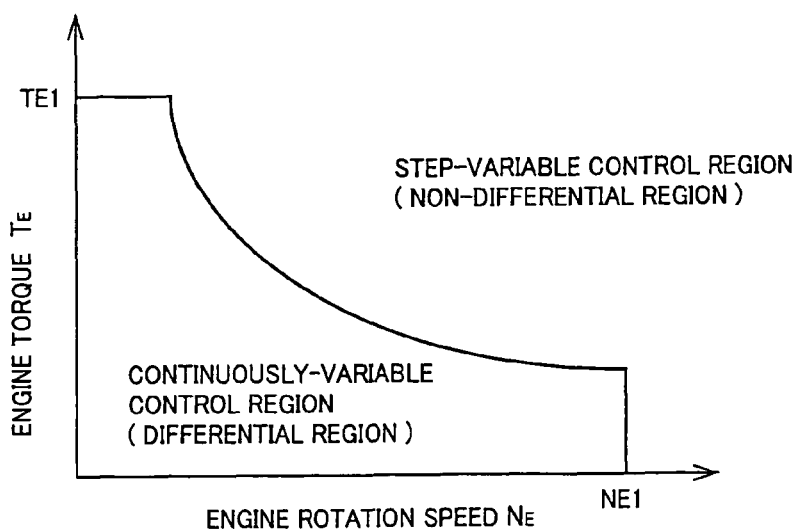
FIG. 8 is a conceptual view, showing the preliminarily stored relationship, involving a boundary line, between a continuously variable control region and a step-variable control region, which is suitable for mapping a boundary between the continuously variable control region and the step-variable control region shown in broken lines in FIG. 7.

FIG. 8 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed $N_E$ and engine torque $T_E$. The switching control means 50 may execute the operation based on the engine rotation speed $N_E$ and engine torque $T_E$ by referring to the switching diagram shown in FIG. 8 in place of the switching diagram shown in FIG. 7. That is, the switching control means 50 may determine whether the vehicle condition, represented with the engine rotation speed $N_E$ and engine torque $T_E$, lies in the step-variable control region or the continuously variable control region. Further, FIG. 8 is also a conceptual view based on which the broken line in FIG. 7 is to be created. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated on the relationships shown in FIG. 7, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

As indicated by the relationship shown in FIG. 8, similarly, the step-variable control region is set to lie in a high-torque region with engine torque $T_E$ exceeding a predetermined given value TE1, a high-speed rotating region with the engine rotation speed $N_E$ exceeding a predetermined given value NE1, or a high output region where the engine output calculated, based on engine torque $T_E$ and the engine rotation speed $N_E$, is greater than a given value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., in the commonly used output region of the engine 8. The boundary line, shown in FIG. 9, between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the running of the vehicle at a low/medium speed and low/medium output, the shifting mechanism 10 is placed in the continuously variable shifting state to ensure the vehicle to have improved fuel economy performance. During the running of the vehicle at a high speed with an actual vehicle speed V exceeding the determining vehicle speed V1, the shifting mechanism 10 is placed in the step-variable shifting state to act as the step-variable transmission. In this moment, the output of the engine 8 is transferred to the drive wheels 38 mainly through a mechanical power transmitting path. This suppresses a loss in conversion between the drive force and electric energy, generated when the shifting mechanism 10 is caused to act as the electrically controlled continuously variable transmission, providing improved fuel consumption.

During the running of the vehicle on the high output drive mode with the drive force correlation value, such as output torque $T_{OUT}$ or the like, which exceeds determining torque T1, the shifting mechanism 10 is placed in the step-variable shifting state to act as the step-variable transmission. In this moment, the output of the engine 8 is transferred to the drive wheels 38 mainly through the mechanical power transmitting path. In this case, the electrically controlled continuously variable transmission is caused to operate in the low/medium speed running region and the low/medium output running region of the vehicle. This enables a reduction in the maximum value of electric energy to be generated by the first electric motor M1, i.e., electric energy to be transmitted by the first electric motor M1, thereby causing the first electric motor M1 per se or a vehicle power transmitting apparatus including such a component part to be further miniaturized in structure.

According to another viewpoint, further, during the running of the vehicle on such a high output drive mode, the driver places more emphasis on a requirement for the drive force and less emphasis on a requirement for a mileage and, thus, the shifting mechanism 10 is switched to the step-variable shifting state (fixed shifting state) rather than to the continuously variable shifting state. With such a switching operation, the driver can enjoy a fluctuation in the engine rotation speed $N_E$, i.e., a rhythmical variation in the engine rotation speed $N_E$ caused by the upshifting in the step-variable automatic shift running mode as shown, for instance, in FIG. 10.

In such a way, the differential portion 11 (shifting mechanism 10) of the present embodiment can be selectively switched to one of the continuously variable shifting state and the step-variable shifting state (fixed shifting state). The switching control means 50 executes the operation based on the vehicle condition to determine the shifting state to be switched in the differential portion 11, thereby causing the shifting state to be selectively switched to either one of the continuously variable shifting state and the step-variable shifting state. With the first embodiment, the engine startup and stop control means 66 operates to start up or stop the engine 8 such that the hybrid control means 52 can execute the operation based on the vehicle condition to switch the engine drive mode and the motor drive mode.

Here, operation oil of the automatic shifting portion 20 incorporated in the shifting mechanism 10 is liquid prevailing in the hybrid vehicle power transmitting apparatus for use in cooling the first and second electric motors M1 and M2 and lubricating a drive system such as the differential-portion planetary gear unit 24 of the differential portion 11 and the first to third planetary gear units 26, 28 and 30 of the automatic shifting portion 20. It is likely that a temperature $TEMP_{ATF}$ (operation oil temperature) of operation oil, representing a temperature of such liquid, is lower than a steady-state value, i.e. no warm-up of the shifting mechanism 10 is completed. In such likelihood, it is conceived that operation oil has high viscosity to cause an increase in rotational resistance of gears or the like with a resultant drop in transmission efficiency of the power transmitting path with an accompanying drop in fuel consumption.

In other words, it can be said that promptly completing the warm-up of the shifting mechanism 10 results in an increase in fuel consumption as a whole. For instance, increasing a heat generation amount of the first electric motor M1 or the second electric motor M2, susceptible to be cooled with operation oil, results in an increase in the operation oil temperature $TEMP_{AT}F$, thereby facilitating the warm-up of the shifting mechanism 10. In addition, the first electric motor M1 or the second electric motor M2 are incorporated in the case 12 serving as a chassis of the shifting mechanism 10 as shown in FIG. 6 and, hence, the increase in the heat generation amount of the first electric motor M1 or the second electric motor M2 directly promotes the warm-up of the shifting mechanism 10.

With a view to minimizing a fuel consumption rate, i.e. with a view to improving fuel consumption, a control is executed for promptly completing the warm-up of the shifting mechanism 10. Hereunder, description is made of such a control operation.

Turning back to FIG. 6, differential state determining means 78 determines as to whether the differential portion 11 lies under a non-differential state. If the switching brake B0 or the switching clutch C0 is engaged to place the power distributing mechanism 16 under the non-differential state, the differential portion 11 is placed under a non-differential state. Accordingly, by detecting a switched state of an electromagnetic valve, operative to switch a hydraulic pressure supplied to, for instance, the switching brake B0 or the switching clutch C0, the differential state determining means 78 can make a determination as to whether the differential portion 11 is placed under the non-differential state.

Temperature determining means 80 determines as to whether the temperature of the shifting mechanism 10, corresponding to the temperature of the hybrid vehicle power transmitting apparatus, is less than a given transmitting apparatus temperature determining value $TEMP_{11}$. By detecting the operation oil temperature $TEMP_{ATF}$ using, for instance, a temperature sensor, the temperature of the shifting mechanism 10 can be determined in response to the resulting operation oil temperature $TEMP_{ATF}$. That is, the operation oil temperature $TEMP_{ATF}$ may be treated intact as the temperature of the shifting mechanism 10. In an alternative, the temperature of the shifting mechanism 10 may include a calculated value obtained by adding a given correcting value, preliminarily retrieved on experimental tests or the like, to the operation oil temperature $TEMP_{ATF}$.

The transmitting apparatus temperature determining value $TEMP_{11}$, corresponding to an on-non-differential-state temperature determining value used in the present invention, represents a threshold value laying at a given value, obtained on experimental tests, which is preliminarily stored as for instance 0° C. in the temperature determining means 80. Assume the temperature of the shifting mechanism 10 exceeds the transmitting apparatus temperature determining value $TEMP_{11}$. Then, a determination is made that no need particularly arises in the light of improvement in fuel consumption to promote the warm-up of the shifting mechanism or no warm-up of the shifting mechanism 10 needs to be promoted with the use of heat generation control means 88, which will be described below. Moreover, the transmitting apparatus temperature determining value $TEMP_{11}$ is lower than the temperature of the shifting mechanism 10 under a predetermined warm-up condition representing a status in which the warm-up of the shifting mechanism 10 has been completed.

Motor-temperature determining means 86 determines as to whether a temperature of the first electric motor M1 is less than a given motor-temperature determining value $TEMP_{12}$. The temperature of the first electric motor M1 is detected with a temperature sensor mounted on the first electric motor M1. If the temperature of the first electric motor M1 exceeds the given motor-temperature determining value $TEMP_{12}$, then the temperature of the first electric motor M1 adversely affect on durability of the first electric motor M1. To avoid such an adverse affect, the given motor-temperature determining value $TEMP_{12}$ is a threshold value enabling a determination to be made that if the temperature of the first electric motor M1 exceeds the given motor-temperature determining value $TEMP_{12}$, then no warm-up of the shifting mechanism 10 is to be promoted upon operating the first electric motor M1. This threshold value is a given value, obtained on experimental tests, which is preliminarily stored as for instance 150° C. in the motor-temperature determining means 86.

Figure 9:
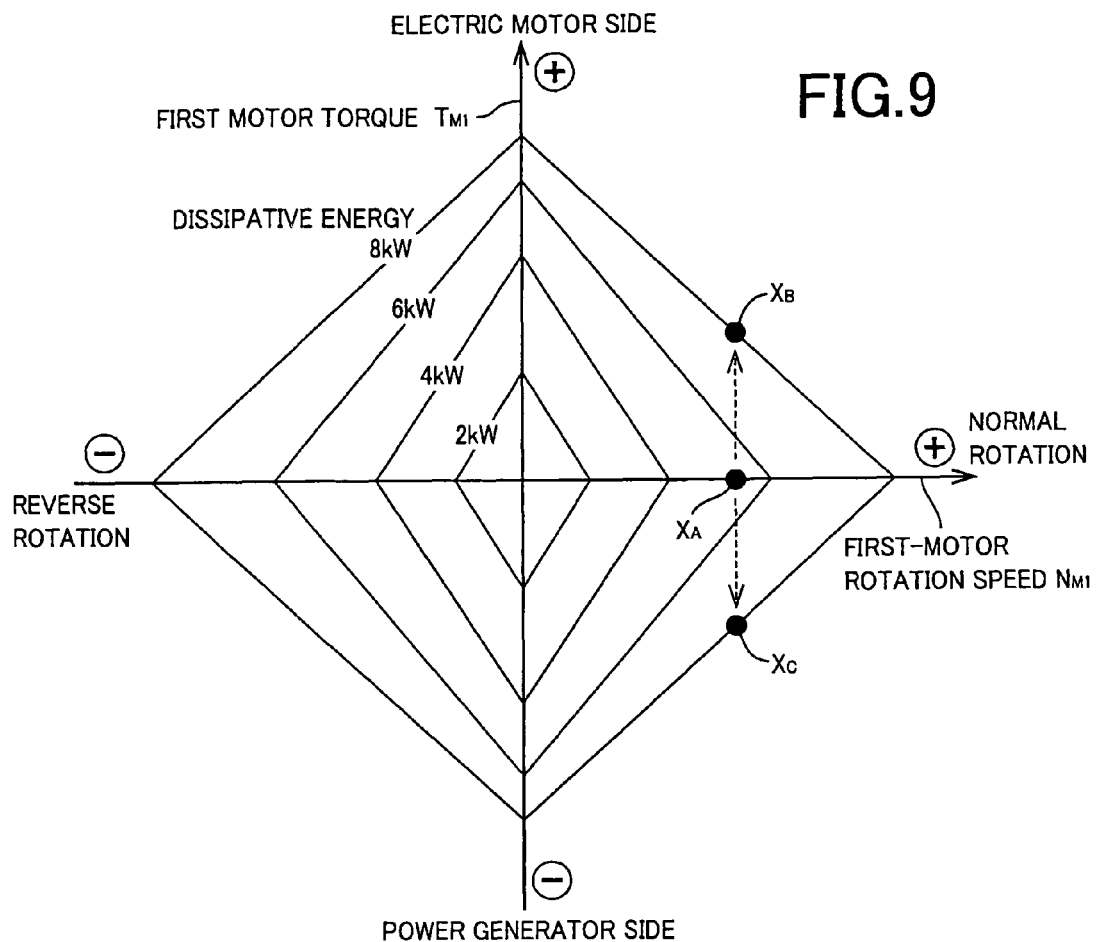
FIG. 9 is a view showing one example of the relationship among the a first-motor rotation speed, first motor torque and dissipative energy of the first electric motor M1 in the form of a two-dimensional coordinates plotted in terms of parameters such as the first-motor rotation speed and first motor torque in the hybrid vehicle power transmitting apparatus shown in FIG. 1.

FIG. 9 is a view, showing one example of the relationship among the a first-motor rotation speed $N_{M1}$, first motor torque $T_{M1}$ and dissipative energy of the first electric motor M1, which is plotted on a two-dimensional coordinates in terms of parameters such as the first-motor rotation speed $N_{M1}$ and output torque $T_{M1}$ (hereinafter referred to as "first motor torque $T_{M1}$") of the first electric motor M1. The first electric motor M1 has an energy loss that is mostly derived from a heat of the first electric motor M1 and has the relationship with the first electric motor M1 having dissipative energy that increases with an accompanying increase in the heat generation amount of the first electric motor M1.

In FIG. 9, for instance, under a circumstance where the first electric motor M1 has an operating state laying at an operating point $X_A$ based on which the first-motor rotation speed $N_{M1}$ and first motor torque $T_{M1}$ are determined, if first motor torque $T_{M1}$ is increased with no change in the first-motor rotation speed $N_{M1}$, the operating state of the first electric motor M1 is altered to an operating point $X_B$. In this case, it is turned out from FIG. 9 that dissipative energy of the first electric motor M1 increases from about 5.5 kW to 8 kW. In addition, under another circumstance where the first electric motor M1, free-wheeling under no load, is rendered operative to function as an electric power generator, the first electric motor M1 encounters negative torque, i.e. a rotational load. In such a case, even if the operating point $X_A$ of the first electric motor M1 is altered to an operating point $X_C$ on, for instance, a diagram shown in FIG. 9, the first electric motor M1 has increasing dissipative energy.

Further, as used herein, the term "heat generation amount corresponding to dissipative energy the first electric motor M1" refers to a heat generation amount generated in terms of unit time as will be understood from the fact that dissipative energy has a unit in "kW" in FIG. 9.

The differential state determining means 78 determines that the differential portion 11 (power distributing mechanism 16) is placed under the non-differential state, and the temperature determining means 80 determines that the temperature of the shifting mechanism 10 is less than the transmitting apparatus temperature determining value $TEMP_{11}$. Upon receipt of such determinations, heat generation control means 88 performs a heat generation control for increasing the heat generation amount, i.e. dissipative energy, of the shifting mechanism 10. However, there is a likelihood that the motor-temperature determining means 86 determines that the temperature of the shifting mechanism 10 is not less than the given motor-temperature determining value $TEMP_{12}$, that is, the temperature of the shifting mechanism 10 is greater than the given motor-temperature determining value $TEMP_{12}$. In such likelihood, the heat generation control is cancelled regardless of the presence on the determination results of the differential state determining means 78 and the temperature determining means 80. Thus, no heat generation control is executed with the heat generation control means 88.

The heat generation control is performed with a view to improving fuel consumption of a vehicle as a whole upon facilitating the warm-up of the shifting mechanism 10. To this end, a comparison is made between the increase in dissipative energy of the first electric motor M1 and the fuel consumption improving effect resulting from the promoted warm-up of the shifting mechanism 10, upon which the heat generation control is performed based on the temperature of the shifting mechanism 10 on a control routine that is preliminarily determined on experimental tests or the like so as to allow the vehicle as a whole to achieve improved fuel consumption.

Figure 10:
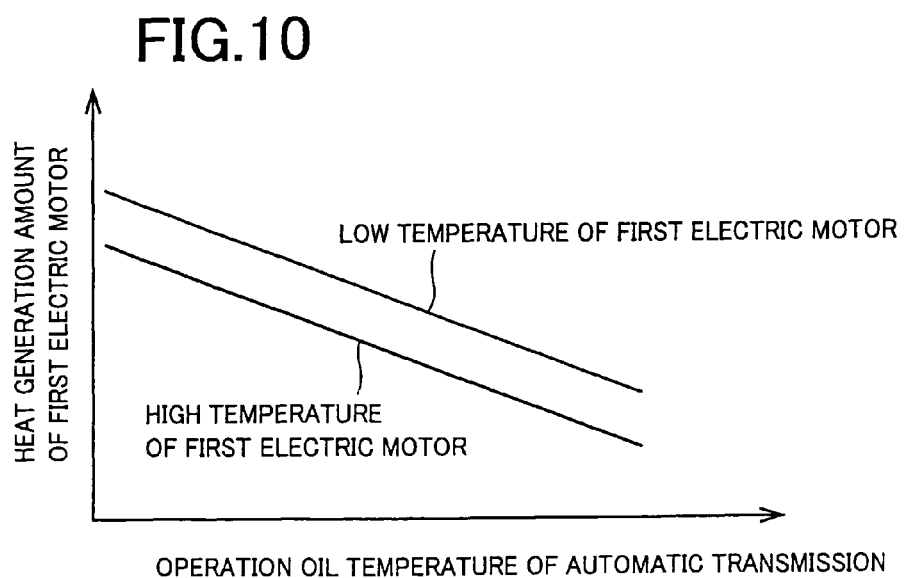
FIG. 10 is a view illustrating the relationship between an operation oil temperature of the automatic shifting portion and the amount of electric power generated with the first electric motor.

As shown in an example in FIG. 10, accordingly, the control may be executed such that the lower the temperature of the shifting mechanism 10 determined based on the operation oil temperature $TEMP_{ATF}$ of the automatic shifting portion 20, the greater will be the heat generation amount of the first electric motor M1. In addition, the first electric motor M1 has an increased allowance against heat resistance of the first electric motor M1 as the temperature of the shifting mechanism 10 increases. Therefore, the relationship between the temperature (operation oil temperature $TEMP_{ATF}$) of the shifting mechanism 10 and the heat generation amount of the first electric motor M1, exemplarily shown in FIG. 10, may be shifted to a side for increasing the heat generation amount of the first electric motor M1.

More particularly, the term "heat generation control", executed with the heat generation control means 88, refers to a control performed when the switching clutch C0 is engaged to place the differential portion 11 (power distributing mechanism 16) under the non-differential state. Under such a state, the heat generation control is performed by rendering the first electric motor M1 operative to function as a motor (electric motor) to increase first motor torque $T_{M1}$ for thereby increasing the heat generation amount of the first electric motor M1. To describe such a control with reference to FIG. 9, the heat generation control is executed by altering, for instance, the operating state of the first electric motor M1 from the operating point $X_A$ to the operating point $X_B$.

On the contrary, the heat generation control may be executed by rendering the first electric motor M1 operative to function as an electric power generator for increasing the rate of generated electric power for thereby increasing the heat generation amount of the first electric motor M1. To describe such a control with reference to FIG. 9, the heat generation control is executed by altering, for instance, the operating state of the first electric motor M1 from the operating point $X_A$ to the operating point $X_C$.

Thus, when operating the first electric motor M1 for the heat generation control, during the heat generation control, the first electric motor M1 is rendered operative to function as the motor under which first motor torque $T_{M1}$ is caused to increase and rendered operative to function as the electric power generator with an accompanying increase in rotational load. Therefore, the heat generation control means 88 may alter engine torque $T_E$ depending on fluctuation in first motor torque $T_{M1}$ or rotational load of the first electric motor M1 during the heat generation control such that output torque of the shifting mechanism 10 approaches output torque of the same generated when no heat generation control is executed.

Further, although the heat generation control is performed using the first electric motor M1, the heat generation control may be performed using the second electric motor M in place of the first electric motor M1 or in combination therewith. That is, the heat generation control may be performed upon increasing the heat generation amount of at least one electric motor incorporated in the differential portion 11, that is, at least one of the heat generation amount of the first and second electric motors M1 and M2. When performing the heat generation control with the use of the second electric motor M2, the motor temperature determining means 86 determines the temperature of the second electric motor M2. Meanwhile, when performing the heat generation control with the use of both the first and second electric motors M1 and M2, the motor temperature determining means 86 determines the temperatures of both the first and second electric motors M1 and M2, respectively.

Furthermore, even for the switching clutch C0 kept disengaged while the switching brake B0 is engaged to cause the differential portion (power distributing mechanism 16) to be placed under the non-differential state, the heat generation control means 88 may execute the heat generation control. In such a case, basically, the heat generation control is performed using the second electric motor M2 that is rotatable. However, if output torque $T_{M1}$ of the first electric motor M1, made non-rotatable due to the switching brake B0 being engaged, is caused to increase, the first electric motor M1 has an increased heat generation amount without rotation thereof. Therefore, the first electric motor M1 may be used to perform the heat generation control within a range not exceeding an upper limit of heat resistance thereof.

Figure 11:
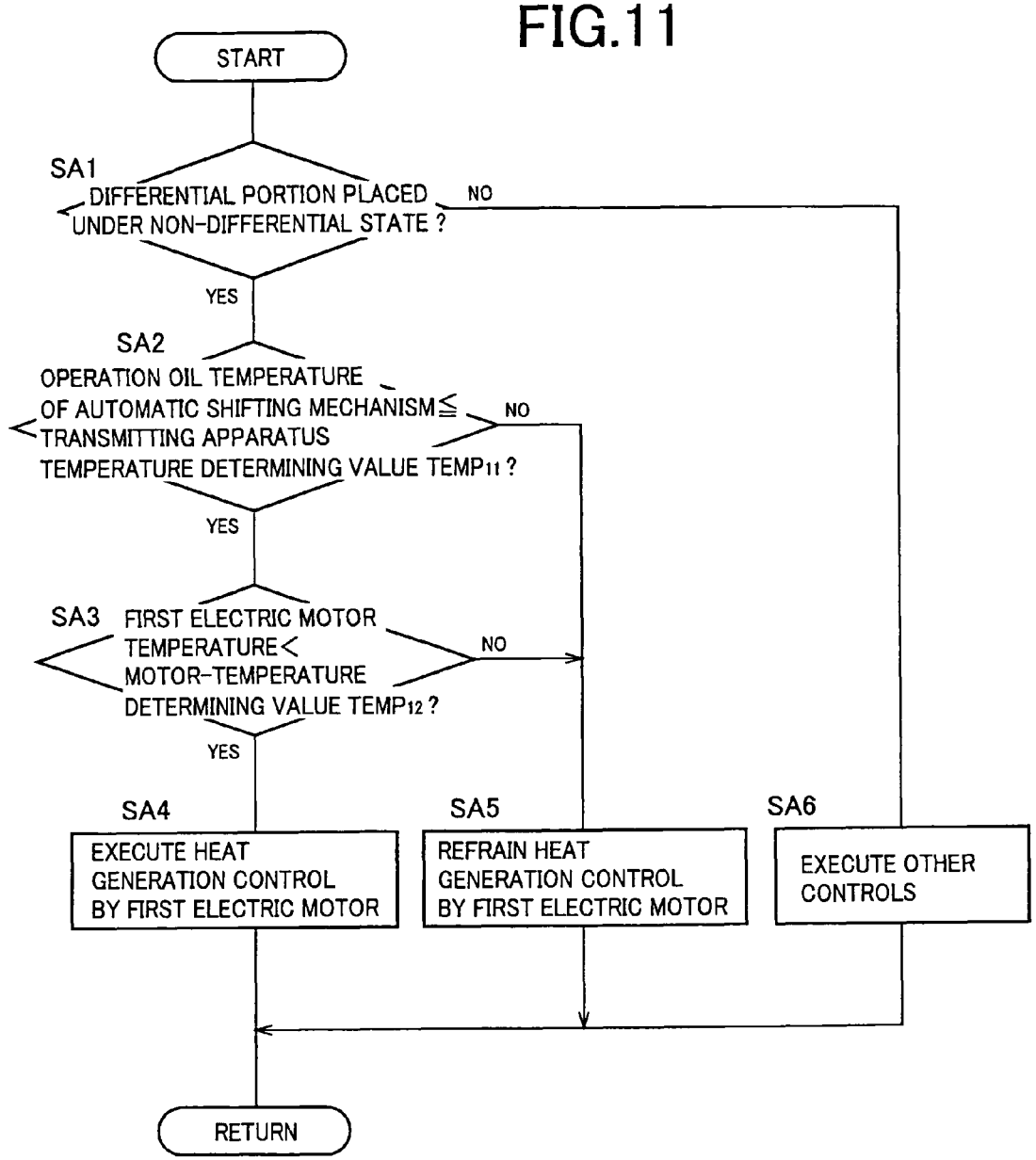
FIG. 11 is a flowchart illustrating a major part of control operations to be executed with the electronic control device shown in FIG. 4, i.e. control operations for facilitating a warm-up of the shifting mechanism.

FIG. 11 is a flow chart illustrating a major part of control operations, to be executed with the electronic control device 40, i.e. control operations for facilitating the warm-up of the shifting mechanism 10, which is repeatedly executed on an extremely short cycle in the order of, for instance, approximately several milliseconds or several tens milliseconds.

First, at step (hereinafter, the term "step" will be omitted) SA1 corresponding to the differential state determining means 78, a query is made as to whether the differential portion 11 is placed under the non-differential state. In this respect, if the power distributing mechanism 16 is brought into the non-differential state due to the engagement of either the switching brake B0 or the switching clutch C0, the differential portion 11 is placed under the non-differential state. Accordingly, by detecting the switching state of the electromagnetic valve for switching the hydraulic pressure being supplied to the switching brake B0 or the switching clutch C0, a determination can be made i.e. determines as to whether the differential portion 11 is placed under the non-differential state. If the answer is YES, i.e. if the differential portion 11 is placed under the non-differential state, then the flow routine goes to SA2. If, on the other hand, the answer is NO, then the flow routine goes to SA6.

At SA2 corresponding to the temperature determining means 80, a query is made as to whether the temperature of the shifting mechanism 10, corresponding to the temperature of the hybrid vehicle power transmitting apparatus, is less than the given transmitting apparatus temperature determining value $TEMP_{11}$. For instance, the temperature sensor detects operation oil temperature $TEMP_{ATF}$ and the query is made based on the operation oil temperature $TEMP_{ATF}$ regarded to be the temperature of the shifting mechanism 10. In this respect, the transmitting apparatus temperature determining value $TEMP_{11}$ is preliminarily determined in the electronic control device 40 at a value of, for instance, 0° C. If the answer to this query is YES, that is, if the temperature of the hybrid vehicle power transmitting apparatus is less than the given transmitting apparatus temperature determining value $TEMP_{11}$, the flow routine proceeds to SA3. If, on the other hand, the answer is NO, then the flow routine goes to SA5.

At SA3 corresponding to the motor-temperature determining means 86, a query is made as to whether the temperature of the first electric motor M1 is less than the given motor-temperature determining value $TEMP_{12}$. The temperature of the first electric motor M1 is detected with, for instance, the temperature sensor incorporated in the first electric motor M1. In this respect, the given motor-temperature determining value $TEMP_{12}$ is preliminarily determined in the electronic control device 40 at a value of, for instance, 150° C. If the answer to this query is YES, that is, if the temperature of the first electric motor M1 is less than the given motor-temperature determining value $TEMP_{12}$, then the flow routine proceeds to SA4. If, on the other hand, the answer is NO, then the flow routine goes to SA5.

At SA4, the heat generation control is executed for increasing the heat generation amount of the first electric motor M1. When, for instance, the switching clutch C0 is engaged with the differential portion 11 (power distributing mechanism 16) being placed under the non-differential state, the first electric motor M1 is rendered operative to function as the motor (electric motor). This increases first motor torque $T_{M1}$ with a resultant increase in the heat generation amount of the first electric motor M1, thereby performing the heat generation control.

At SA5, no heat generation control is executed. In addition, SA4 and SA5 collectively correspond to the heat generation control means 88. At SA6, a control is executed for the differential portion 11 placed under the differential state.

The electronic control device 40 of the present embodiment has various advantageous effects (A1) to (A9) as listed below.

(A1) When the differential portion 11 is placed under the non-differential state and the temperature of the shifting mechanism 10 is less than the given transmitting apparatus temperature determining value $TEMP_{11}$ corresponding to the on-non-differential-state temperature determining value of the present invention, the heat generation control is executed for increasing the heat generation amount of the first electric motor M1. Therefore, the temperature of the shifting mechanism 10 can be promptly increased due to heat development of the first electric motor M1, with accompanying improvement in fuel consumption due to the prompt completion in warm-up of the shifting mechanism 10.

(A2) The heat generation control may be performed such that the lower the temperature of the shifting mechanism 10, the greater will be the heat generation amount of the first electric motor M1. With the heat generation control performed in such a way, it becomes possible to avoid a delay in warm-up of the shifting mechanism 10 even if it remains at a low temperature.

(A3) The temperature of the shifting mechanism 10 can be determined based on the operation oil temperature $TEMP_{ATF}$ of the automatic shifting portion 20. Therefore, detecting the operation oil temperature $TEMP_{ATF}$ enables the temperature of the shifting mechanism 10 to be easily determined.

(A4) When the motor-temperature determining means 86 determines that the temperature of the first electric motor M1 becomes greater than the motor-temperature determining value $TEMP_{12}$, the heat generation control is cancelled regardless of the determination result of the temperature determining means 80, i.e. the temperature of the shifting mechanism 10. This prevents the temperature of the first electric motor M1 from exceeding an upper limit temperature on a preliminary assumption, thereby avoiding such a temperature from adversely affecting durability of the first electric motor M1.

(A5) The automatic shifting portion 20 is comprised of a step-variable automatic shifting portion of the type providing a speed ratio that can automatically vary. This enables the automatic shifting portion 20 to vary the speed ratio in a wide range, while achieving a reduction in manipulation load of a driver.

(A6) The heat generation control may be performed upon increasing the heat generation amount of at least one of the first and second electric motors M1 and M2. In such a case, the temperature of the shifting mechanism 10 can be promptly increased due to heat developments of the first electric motor M1 and/or the second electric motor M2, thereby facilitating the warm-up of the shifting mechanism 10.

(A7) The differential portion 11 operates to act as a continuously variable transmission (continuously variable transmitting mechanism) upon controlling the operating state of the first electric motor M1. This can allow the differential portion 11 to provide drive torque in a smooth fashion. In addition, the differential portion 11 can be rendered operative not only to act as an electrically controlled continuously variable transmission operative to continuously vary a speed ratio but also to act as a step-variable transmission that varies the speed ratio step-by-step.

(A8) Engine torque $T_E$ may be altered depending on output torque $T_{M1}$ of the first electric motor M1 used in the heat generation control, or fluctuation in rotational load such that output torque of the shifting mechanism 10 approaches output torque of the shifting mechanism 10 obtained when no heat generation control is obtained. In such a case, even if the heat generation control is performed, a vehicle occupant has almost no feeling resulting from such a control, thereby avoiding the vehicle occupant to have uncomfortable feeling.

(A9) The first electric motor M1 is cooled with operation oil of the automatic shifting portion 20 with operation oil composed of liquid filled in the hybrid vehicle power transmitting apparatus. Therefore, the heating value of the first electric motor M1 is increased with an accompanying increase in operation oil temperature $TEMP_{ATF}$ of the automatic shifting portion 20, thereby facilitating the warm-up of the shifting mechanism 10.

Next, another embodiment of the present invention will be described below. Also, component parts common to the various embodiment bear like reference numerals throughout the following description to omit redundant description.

Second Embodiment

With a second embodiment, the shifting mechanism 10 of the first embodiment is replaced by a shifting mechanism 210 shown in FIG. 12. FIG. 12 is a skeleton view, illustrating the shifting mechanism 210 forming part of a hybrid vehicle power transmitting apparatus to which the present invention is applied, which shows a structure basically corresponding to the first embodiment shown in FIG. 1 with the exception that the switching clutch C0 and the switching brake B0 are omitted.

As shown in FIG. 12, the shifting mechanism 210 includes the input shaft 14 serving as the input rotary member coaxially disposed in the transmission case (hereinafter referred to as "case 12") mounted on the vehicle body to act as the non-rotary member, a differential portion 211 directly connected to the input shaft 14 or indirectly connected thereto via a pulsation absorbing damper (vibration damping device) (not shown) to act as a continuously variable shifting portion, the automatic shifting portion 20 connected to the differential portion 211 in series via the power transmitting path between the differential portion 211 and the drive wheels 38 (see FIG. 15) and the power transmitting member (power transmitting shaft) 18 to act as the power transmitting portion, and the output shaft 22 connected to the automatic shifting portion 20 to act as the output rotary member.

The shifting mechanism 210 is of the type that is appropriately applied to, for instance, an FR (Front engine Rear drive) mounted on the vehicle in a longitudinal direction thereof. The shifting mechanism 210 is interposed between the engine 8 comprised of the internal combustion engine such as for instance the gasoline engine or the diesel engine or the like, and the pair of drive wheels 38. The gasoline engine etc. acts as the running drive-force source directly connected to the input shaft 14 or indirectly connected thereto through the pulsation absorbing damper. The engine 8 outputs the drive power that is transferred to the pair of drive wheels 38 in sequence through a differential gear unit (final speed reduction gear) 36 (see FIG. 15), forming part of the power transmitting path, and a pair of axles.

With the transmission mechanism i.e. shifting mechanism 210 of the second embodiment, the engine 8 and the differential portion 11 are directly connected to each other. As used herein, the term "directly connected to each other" refers to a structure under which a direct connection is established between the associated component parts in the absence of a fluid-operated power transmitting apparatus, such as a torque converter or a fluid coupling device or the like, and a connection including, for instance, the pulsation absorbing damper is involved in such a direction connection. It is noted that a lower half of the shifting mechanism 210, which is constructed symmetrically with respect to its axis, is omitted in FIG. 12. This is also true for the other embodiments of the invention described below.

The differential portion 211 corresponding to the electrically controlled differential portion includes a first electric motor M1, a power distributing mechanism 216, structured in a mechanical mechanism for mechanically distributing an output of the engine 8 applied to the input shaft 14, which functions as a differential mechanism through which the engine output is distributed to the first electric motor M1 and the power transmitting member 18, and a second electric motor M2 operatively connected to the power transmitting member 18 to be unitarily rotate therewith. In the second embodiment, both the first and second electric motors M1 and M2 are so-called motor/generators each having a function to generate electric power. The first electric motor M1 has at least a function as an electric power generator for generating a reaction force. The second electric motor M2 has at least a function as a motor (electric motor) serving as a running drive power source to output a vehicle drive force.

A power distributing mechanism 216, corresponding to the differential mechanism of the present invention, is mainly comprised of the differential-portion planetary gear unit 24 of a single pinion type having a given gear ratio ρ0 of approximately, for instance "0.418". The differential-portion planetary gear unit 24 includes the rotary elements (elements) such as the differential-portion sun gear S0, the differential-portion planetary gears P0, the differential-portion carrier CA0 supporting the differential-portion planetary gears P0 to be rotatable about their axes and about the axis of the differential-portion sun gear S0, and the differential-portion ring gear R0 held in meshing engagement with the differential-portion sun gear S0 through the differential-portion planetary gears P0. With the differential-portion sun gear S0 and the differential-portion ring gear R0 assumed to have the numbers of gear teeth represented by ZS0 and ZR0, respectively, the gear ratio ρ0 is expressed as ZS0/ZR0.

With the power distributing mechanism 216, a differential portion carrier CA0 is connected to the input shaft 14, i.e., the engine 8; a differential-portion sun gear S0 is connected to the first electric motor M1; and a differential-portion ring gear R0 is connected to the power transmitting member 18. With the power distributing mechanism 216 of such a structure, the three elements of the differential-portion planetary gear set 24, i.e., the differential-portion sun gear S0, the differential-portion carrier CA0 and the differential-portion ring gear R0 are arranged to rotate relative to each other for initiating a differential action, that is, in a differential state under which the differential action is initiated. This allows the engine output to be distributed to the first electric motor M1 and the power transmitting mechanism 18. Then, a part of the distributed engine output drives the first electric motor M1 to generate electric energy, which is stored and used for rotatably driving the second electric motor M2. Thus, the differential-portion 11 (power distributing mechanism 16) is caused to function as an electric differential device such that, for instance, the differential-portion 11 is placed in a so-called continuously variable shifting state (electrically established CVT state) to continuously vary the rotation of the power transmitting member 18 regardless of the engine 8 operating at a given rotational speed.

That is, the differential-portion 211 functions as an electrically controlled continuously variable transmission to provide a speed ratio γ0 (rotational speed $N_{IN}$ of the input shaft 14/rotational speed $N_{18}$ of the power transmitting member 18) that is continuously variable from a minimum value γ0min to a maximum value γ0max. In this way, controlling the driving conditions of the first and second electric motors M1 and M2 and the engine 8 all connected to the power distributing mechanism 16 (differential portion 11) controls the differential state between the rotation speeds between the input shaft 14 and the transmitting member 18.

The automatic shifting portion 20 corresponding to the claimed shifting portion forms a part of the power transmitting path extending from the differential portion 211 to the drive wheels 38 and includes a single-pinion type first planetary gear set 26, a single-pinion type second planetary gear set 28 and a single-pinion type third planetary gear set 30. The automatic shifting portion 20 is a planetary gear type multiple-step transmission operable as a step-variable automatic transmission.

The first planetary gear set 26 has a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a given gear ratio ρ1 of about "0.562". The second planetary gear set 28 has a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a given gear ratio ρ2 of about "0.425".

The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a given gear ratio ρ3 of, for instance, about "0.421". With the first sun gear S1, first ring gear R1, second sun gear S2, second ring gear R2, third sun gear S3 and third ring gear R3 having the numbers of gear teeth represented by ZS1, ZR1, ZS2, ZR2, ZS3 and ZR3, respectively, the gear ratios ρ1, ρ2 and ρ3 are expressed by ZS1/ZR1, ZS2/ZR2, and ZS3/ZR3, respectively.

In the automatic shifting portion 20, the first and second sun gears S1, S2 are integrally connected to each other, selectively connected to the power transmitting member 18 through a second clutch C2, and selectively connected to the casing 12 through a first brake B1. The first carrier CA1 is selectively connected to the casing 12 through a second brake B2, and the third ring gear R3 is selectively connected to the casing 12 through a third brake B3. The first ring gear R1, second carrier CA2 and third carrier CA3 are integrally connected to each other and connected to the output shaft 22. The second ring gear R2 and the third sun gear S3 are integrally connected to each other and selectively connected to the power transmitting member 18 through a first clutch C1.

Thus, the automatic shifting portion 20 and the differential portion 211 (power transmitting member 18) are selectively connected to each other through the first clutch C1 or the second clutch C2, which is provided to establish each gear position (shift gear position) in the automatic shifting portion 20. In other words, the first and second clutches C1, C2 function as coupling devices i.e., engaging device operable to place the power transmitting path between the power transmitting member 18 and the automatic shifting portion 20, that is, the power transmitting path between the differential portion 211 (power transmitting member 18) and the drive wheels 34, selectively in one of a power transmitting state in which the vehicle drive force can be transmitted through the power transmitting path, and the power cut-off state in which the vehicle drive force cannot be transmitted through the power transmitting path. That is, with at least one of the first and second clutches C1 and C2 brought into coupling engagement, the power transmitting path is placed in the power transmitting state. In contrast, uncoupling both the first and second clutches C1 and C2 places the power transmitting path in the power cut-off state.

With the automatic shifting portion 20, further, uncoupling an on-uncoupling side coupling device while coupling an on-coupling side coupling device allows a so-called "clutch-to-clutch" shifting action to be executed for respective gear positions to be selectively established. This allows a speed ratio γ (rotational speed $N_{18}$ of the power transmitting member 18/rotational speed $N_{OUT}$ of the output shaft 22) to be obtained in equally varying ratio for each gear position.

As indicated in the coupling operation table shown in FIG. 13, coupling the first clutch C1 and third brake B3 establishes 1st-speed gear position having a speed ratio γ1 of approximately, for instance, "3.357". With the first clutch C1 and second brake B2 coupled in operation, a 2nd-speed gear position is established with a speed ratio γ2 of, for instance, approximately "2.180", which is lower a value of the speed ratio γ1. With the first clutch C1 and first brake B1 coupled in operation, a 3rd-speed gear position is established with a speed ratio γ3 of, for instance, approximately "1.424", which is lower a value of the speed ratio γ2. Coupling the first clutch C1 and second clutch C2 establishes a 4th-speed gear position with a speed ratio γ4 of, for instance, approximately "1.000", which is lower than the speed ratio γ3.

Coupling the second clutch C2 and third brake B3 establishes a reverse-drive gear position (reverse-drive shift position) with a speed ratio γR of, for instance, approximately 3.209, which is intermediate between those of the 1st-speed gear position and the 2nd-speed gear position. In addition, uncoupling i.e., disengaging or releasing the first clutch C1, second clutch C2, first brake B1, second brake B2 and third brake B3 allows a neutral position N to be established.

The first clutch C1, second clutch C2, first brake B1, second brake B2 and third brake B3 (hereinafter collectively referred to as clutch C and brake B, unless otherwise specified) are hydraulically operated frictional coupling devices that are used in the related art vehicular automatic transmission. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional coupling device serves to selectively provide a drive connection between two component parts between which each clutch or brake is interposed.

With the shifting mechanism 210 of such a structure, the differential portion 211 serving as the continuously variable transmission, and the automatic shifting portion 20 constitute a continuously variable transmission. Further, with the differential portion 211 controlled so as to provide a speed ratio kept at a fixed level, the differential portion 211 and the automatic shifting portion 20 can provide the same state as that of a step-variable transmission.

More particularly, the differential portion 211 functions as the continuously variable transmission, and the automatic shifting portion 20 connected to the differential portion 211 in series functions as the step-variable transmission. Thus, the rotational speed, input to the automatic shifting portion 20 placed for at least one gear position M, (hereinafter referred to as "input rotational speed of the automatic shifting portion 20"), i.e., the rotational speed of the power transmitting member 18 (hereinafter referred to as "transmitting-member rotational speed $N_{18}$") are caused to continuously vary, thereby enabling the gear position M to have a continuously variable speed range. Accordingly, the shifting mechanism 10 provides an overall speed ratio γT (rotational speed $N_{IN}$ of the input shaft 14/rotational speed $N_{OUT}$ of the output shaft 22) in a continuously variable range. Thus, the continuously variable transmission is established in the shifting mechanism 210. The overall speed ratio γT of the shifting mechanism 210 is the total speed ratio γT of a whole of the automatic shifting portion 20 that is established based on the speed ratio γ0 of the differential portion 211 and the speed ratio γ of the automatic shifting portion 20.

For the respective gear positions such as, for instance, the 1st-speed to 4th-speed gear positions of the automatic shifting portion 20 and the reverse-drive gear position as indicated in the coupling operation table shown in FIG. 13, the trans-mitting-member rotational speed $N_{18}$ is continuously varied with each gear position being obtained in a continuously variable speed range. Accordingly, a continuously variable speed ratio is present between adjacent gear positions, enabling the whole of the shifting mechanism 210 to have the total speed ratio γT in a continuously variable range.

Further, the speed ratio γ0 of the differential portion 211 is controlled so as to lay at a fixed level and the clutch C and brake B are selectively coupled, thereby causing either one of the 1st-speed to 4th-speed gear positions or the reverse-drive gear position (reverse-drive shift position) to be selectively established. This allows the overall speed ratio γT, variable in a nearly equal ratio, of the shifting mechanism 210 to be obtained for each gear position. Thus, the shifting mechanism 210 can be established in the same state as that of the step-variable transmission.

If, for instance, the differential portion 211 is controlled so as to provide the speed ratio γ0 at a fixed value of "1", the shifting mechanism 210 provides the total speed ratio γT for each gear position of the 1st-speed to 4th-speed gear positions of the automatic shifting portion 20 and the reverse-drive gear position as indicated by the coupling operation table shown in FIG. 13. Further, if the automatic shifting portion 20 is controlled under the 4th-speed gear position so as to cause the differential portion 211 to have the speed ratio γ0 of approximately, for instance, "0.7" less than a value of "1", the automatic shifting portion 20 has the total speed ratio γT of approximately, for instance, "0.7" that is less than a value of the 4th-speed gear position.

Figure 14:
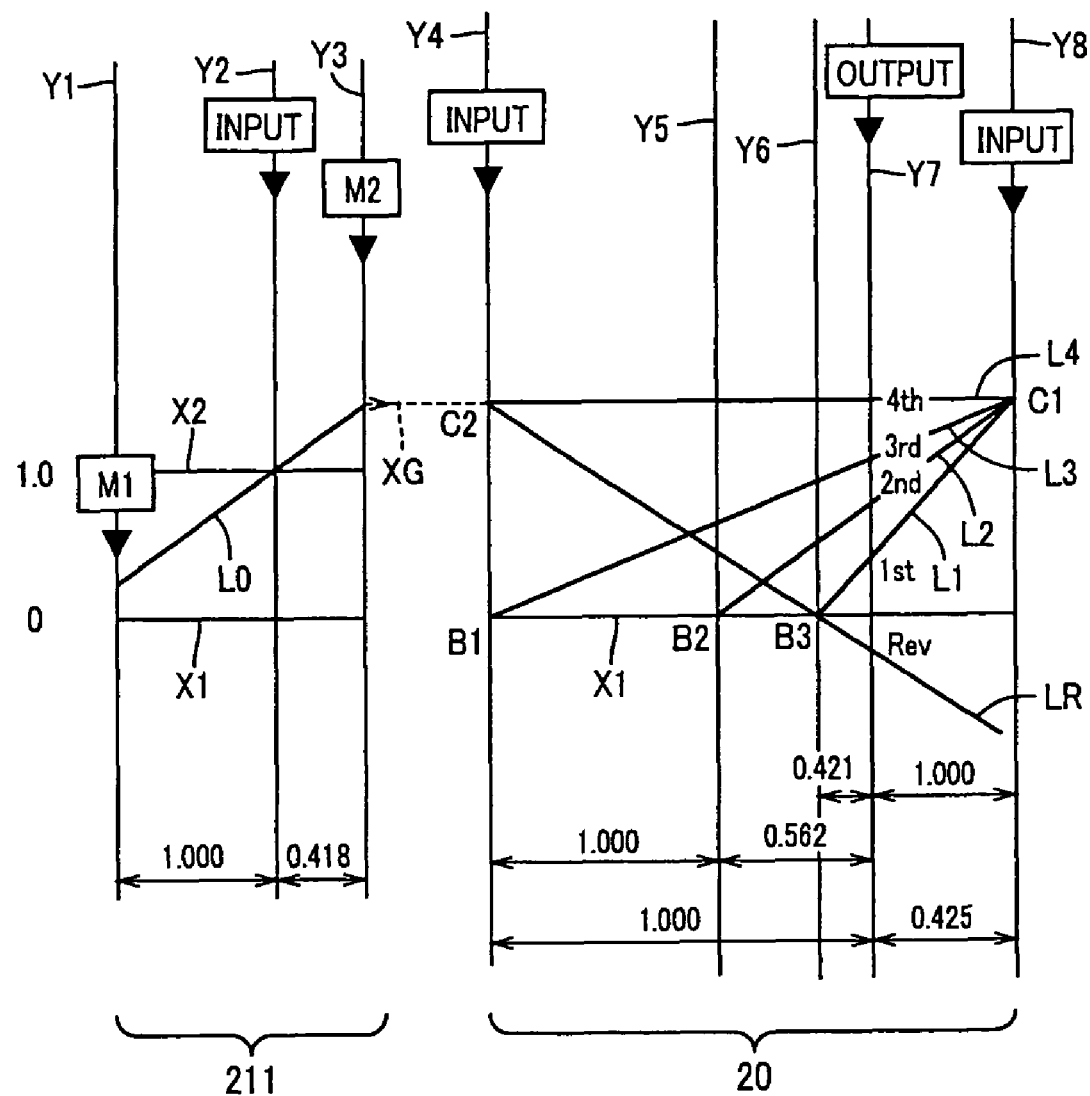
FIG. 14 is a collinear chart indicating mutually relative rotating speeds of rotary elements establishing various gear positions in the hybrid vehicle power transmitting apparatus shown in FIG. 12, corresponding to FIG. 3.

FIG. 14 is a collinear chart for the shifting mechanism 210, including the differential portion 211 and the automatic shifting portion 20, wherein the relative motion relationships among the rotational speeds of the various rotary elements in different coupling states for each gear position can be plotted on straight lines. The collinear chart of FIG. 14 takes the form of a two-dimensional coordinate system having the abscissa axis plotted with the gear ratios ρ of the planetary gear sets 24, 26, 28, 30 and the ordinate axis plotted with the mutually relative rotating speeds of the rotary elements. A transverse line X1 indicates the rotational speed that is zeroed; a transverse line X2 the rotational speed of "1.0", that is, the rotating speed $N_E$ of the engine 8 connected to the input shaft 14; and a transverse line XG the rotational speed of the power transmitting member 18.

Starting from the left, three vertical lines Y1, Y2 and Y3, associated with the three elements of the power distributing mechanism 16 forming the differential portion 11, represent the mutually relative rotating speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3, respectively. A distance between the adjacent vertical lines is determined based on the gear ratio ρ0 of the differential-portion planetary gear set 24.

Starting from the left, further, five vertical lines Y4, Y5, Y6, Y7 and Y8 for the automatic shifting portion 20 represent the mutually relative rotating speeds of: the first and second sun gears S1, S2, connected to each other, which corresponds to a fourth rotary element (fourth element) RE4; the first carrier CA1 corresponding to a fifth rotary element (fifth element) RE5; the third ring gear R3 corresponding to a sixth rotary element (sixth element) RE6; the first ring gear R1, second carriers CA2 and third carriers CA3, connected to each other, which correspond to a seventh rotary element (seventh element) RE7; and the second ring gear R2 and third sun gear S3 connected to each other and corresponding to an eighth rotary element (eighth element) RE8, respectively. Each distance between the adjacent vertical lines is determined based on the gear ratios ρ1, ρ2 and ρ3 of the first, second and third planetary gear sets 26, 28, 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ0. For the automatic shifting portion 20, further, the space between the sun gear and carrier is set to the distance corresponding to the value of "1" for each of the first, second and third planetary gear sets 26, 28, 30, for which the space between the carrier and ring gear is set to the distance corresponding to the gear ratio ρ.

Referring to the collinear chart of FIG. 14, the power distributing mechanism 216 (differential portion 211) of the shifting mechanism 210 is arranged such that the first rotary element RE1 (differential-portion carrier CA0) of the differential-portion planetary gear set 24 is connected to the input shaft 14, i.e., the engine 8, and the second rotary element RE2 is connected to the first electric motor M1. The third rotary element RE3 (differential-portion ring gear R0) is connected to the power transmitting member 18 and the second electric motor M2. Thus, a rotary motion of the input shaft 14 is transmitted (input) to the automatic shifting portion 20 through the power transmitting member 18. A relationship between the rotational speeds of the differential-portion sun gear S0 and the differential-portion ring gear R0 is represented by an inclined straight line L0 which passes across a point of intersection between the lines Y2 and X2.

Now, description is made of a case in which, for example, the differential portion 211 is placed in a differential state with the first to third rotary elements RE1 to RE3 enabled to rotate relative to each other while the rotational speed of the differential-portion ring gear R0, indicated at an intersecting point between the straight line L0 and the vertical line Y3, is bound with the vehicle speed V and remains at a nearly constant level. In this case, as the engine speed $N_E$ is controlled with the rotational speed of the differential-portion carrier CA0, as represented by an intersecting point between the straight line L0 and the vertical line Y2, being raised or lowered, the rotational speed of the differential-portion sun gear S0, i.e., the rotational speed of the first electric motor M1, indicated by an intersecting pint between the straight line L0 and the vertical line Y1, is raised or lowered.

On controlling the rotational speed of the first electric motor M1 so as to allow the differential portion 11 to have the speed ratio γ0 of "1" with the differential-portion sun gear S0 rotating at the same speed as the engine speed $N_E$, the straight line L0 is aligned with the horizontal line X2. When this takes place, the differential-portion ring gear R0, i.e., the power transmitting member 18, is caused to rotate at the same speed as the engine speed $N_E$. On the contrary, if the rotational speed of the first electric motor M1 is controlled so as to allow the differential portion 211 to have the speed ratio γ0 of a value less than "1", for instance, a value of approximately "0.7" with the rotational speed of the differential-portion sun gear S0 being zeroed, the power transmitting member 18 is caused to rotate at an increased transmitting-member rotational speed $N_{18}$ higher than the engine speed $N_E$.

With the automatic shifting portion 20, the fourth rotary element RE4 is selectively connected to the power transmitting member 18 via the second clutch C2 and selectively connected to the casing 12 via the first brake B1 with the fifth rotary element RE5 being selectively connected to the casing 12 via the second brake B2. The sixth rotary element RE6 is selectively connected to the casing 12 via the third brake B3 with the seventh rotary element RE7 connected to the output shaft 22, and the eighth rotary element RE8 is selectively connected to the power transmitting member 18 via the first clutch C1.

Next, a case is described wherein with the automatic shifting portion 20, the differential portion 11 is placed in a state where rotation of the transmitting member 18 which is the output rotary member is input to the eighth rotary element RE8 with coupling of the first clutch C1 upon which the first clutch C1 and the third brake B3 are coupled as shown in FIG. 14. In this case, the rotational speed of the output shaft 22 for the 1st-speed gear position is represented by an intersecting point between the inclined line L1, passing across an intersecting point between the vertical line Y8, indicative of the rotational speed of the eighth rotary element RE8, and the horizontal line X2 and a point of intersection between the vertical line Y6, indicative of the rotational speed of the sixth rotary element RE6, and the horizontal line X1, and an intersecting point intersecting the vertical line Y7 indicative of the rotational speed of the seventh rotary element RE connected to the output shaft 22 as indicated in FIG. 14.

Similarly, the rotational speed of the output shaft 22 for the 2nd-speed gear position is represented by an intersecting point between an inclined straight line L2, determined when the first clutch C1 and second brake B2 are coupled, and the vertical line Y7 indicative of the rotational speed of the seventh rotary element RE7 connected to the output shaft 22. The rotational speed of the output shaft 22 for the 3rd-speed gear position is represented by an intersecting point between an inclined straight line L3, determined with the first clutch C1 and first brake B1 being coupled, and the vertical line Y7 indicative of the rotational speed of the seventh rotary element RE7 connected to the output shaft 22. The rotational speed of the output shaft 22 for the 4th-speed gear position is represented by an intersecting point between a horizontal straight line L4, determined with the first clutch C1 and second clutch C2 being coupled, and the vertical line Y7 indicative of the rotational speed of the seventh rotary element RE7 connected to the output shaft 22.

Figure 15:
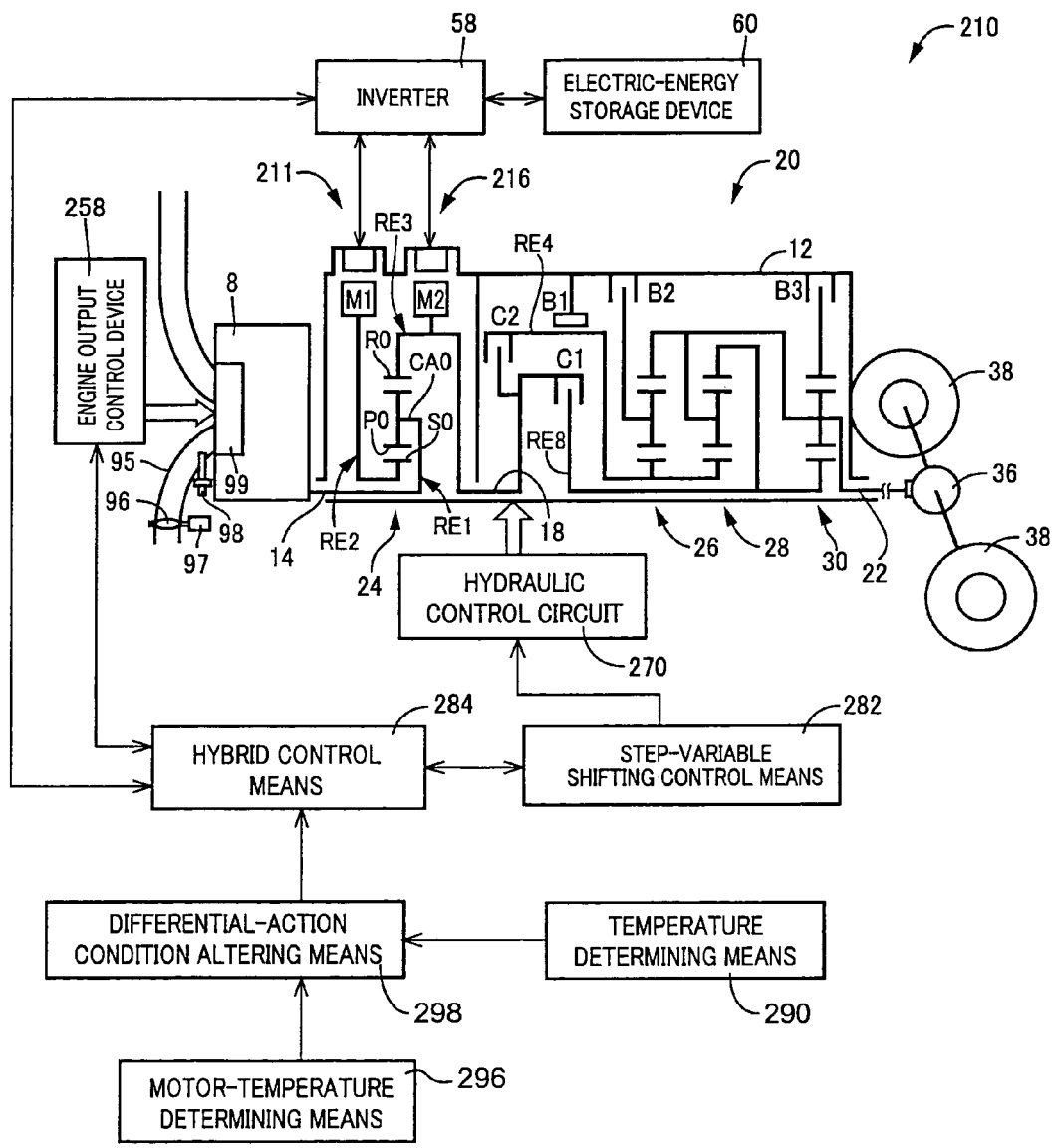
FIG. 15 is a functional block diagram illustrating major control functions of the electronic control unit of FIG. 4 in the first embodiment.
Figure 16:
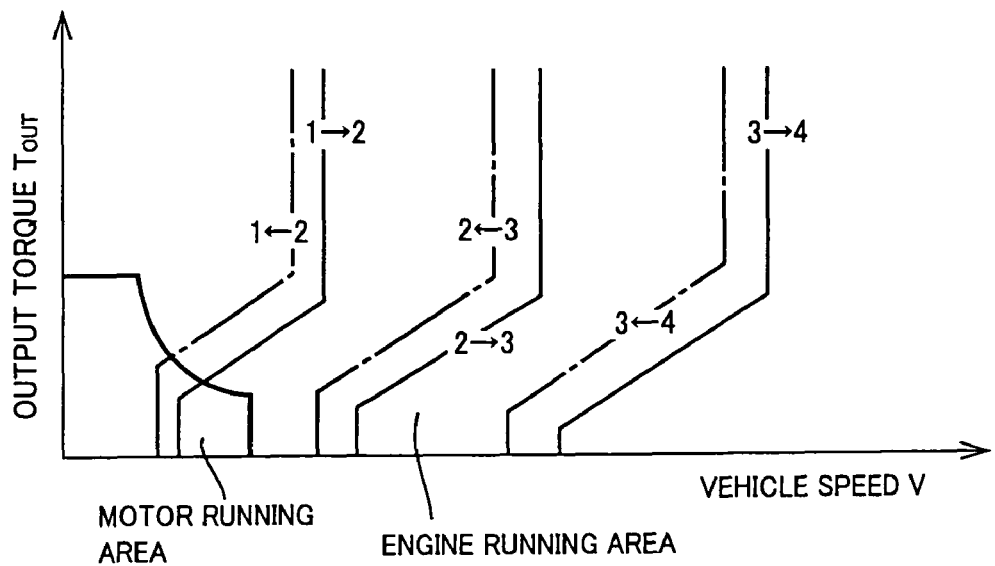
FIG. 16 is a view representing one example of a preliminarily stored shifting diagram, based on which a determination is made whether to initiate the shifting in an automatic shifting portion of the hybrid vehicle power transmitting apparatus shown in FIG. 12, which is plotted on a common two-dimensional coordinate in terms of parameters such as a vehicle speed and output torque and another example of a preliminarily stored drive-force source switching diagram. The drive-force source switching diagram has a boundary line between an engine drive region and a motor drive region to be used for switching an engine drive mode and a motor drive running mode.

FIG. 15 is a functional block diagram illustrating major control functions to be executed by the electronic control unit 280. Step-variable shifting control means 282 determines a shift demand to the automatic shifting portion 20 based on the output shaft rotational-speed relevant value and a driver's request to cause the automatic shifting portion to execute the automatic shift control so as to obtain a demanded shift position in response to the shift demand. For instance, the step-variable shifting control means 282 determines whether to execute the shifting of the automatic shifting portion 20, i.e., the gear position to be shifted for causing the automatic shifting portion to execute the automatic shift control, based on the vehicle condition, represented by an actual vehicle speed V and the required output torque $T_{OUT}$ of the automatic shifting portion 20 by referring to the relationships (shifting lines and shifting map) involving up-shift lines (in solid lines) and down-shift lines (in single dot lines) that are preliminarily stored as parameters of the vehicle speed V and the output torque $T_{OUT}$ of the automatic transmission 20 represented in FIG. 16.

When this takes place, the step-variable shifting control means 282 outputs commands (a shift output command and a hydraulic pressure command) to the hydraulic control circuit 270 for coupling and/or uncoupling the hydraulically operated frictional coupling devices, involved in the shifting of the automatic shifting portion 20 so as to establish the gear position in accordance with the coupling table shown in FIG. 13. That is, the step-variable shifting control means 82 outputs a command to the hydraulic control circuit 270 for uncoupling the on-uncoupling coupling device involved in the shifting, while coupling the on-coupling coupling device to cause the clutch-to-clutch shifting to be executed. Upon receipt of such commands, the hydraulic control circuit 270 causes the linear solenoid valves SL of the automatic shifting portion 20 to be actuated. This allows the hydraulically operated actuators of the hydraulically operated frictional coupling devices, involved in the relevant shifting, to be actuated. Thus, for instance, the on-uncoupling side coupling device is uncoupled and the on-coupling side coupling device is coupled, causing the automatic shifting portion 20 to execute the shifting.

Hybrid control means 284 operates the engine 8 in an optimum operating range at a high efficiency while distributing the drive forces of the engine 8 and the second electric motor M2 at optimum rates and optimally varying a reacting force of the first electric motor M1 during the operation thereof to generate electric power, thereby controllably operating the differential portion 211 under an electrically controlled continuously variable transmission to control a speed ratio γ0. At a vehicle speed V during the running of the vehicle in one occasion, for instance, a target (demanded) output for the vehicle is calculated based on the accelerator opening Acc and the vehicle speed V both representing output demanded variables of the driver, after which a demanded total target output is calculated based on the target output of the vehicle and a battery charge demanded value. Subsequently, a target engine output is calculated in consideration of a loss in power transmission, loads of auxiliary units, assist torque of the second electric motor M2 or the like so as to obtain the total target output. Then, the hybrid control means 284 controls the engine 8, while controlling a rate of electric power being generated by the first electric motor M1, so as to obtain the engine speed $N_E$ and engine torque $T_E$ such that the target engine output is obtained.

The hybrid control means 284 executes such controls in consideration of, for instance, the gear position of the automatic shifting portion 20 with a view to increasing a dynamic performance and improving fuel consumption. During such hybrid controls, the differential portion 211 is caused to operate as the electrically controlled continuously variable transmission such that the engine speed $N_E$ and the vehicle speed V, determined for the engine 8 to operate in the operating range at a high efficiency, match the vehicle speed and the rotational speed of the power transmitting member 18 determined with the gear position in the automatic shifting portion 20.

That is, the hybrid control means 284 determines a target value of the total speed ratio γT of the shifting mechanism 210 such that the engine 8 is caused to operate along an optimal fuel efficiency curve (a fuel efficiency map and the relationships) of the engine 8 which is preliminarily and experimentally obtained and prestored. This achieves a compromise between driveability and fuel consumption during the running of the vehicle under a continuously variable shifting mode on a two-dimensional coordinate established with the engine speed $N_E$ and output torque (engine torque) $T_E$ of the engine 8.

For instance, the target value of the total speed ratio γT of the shifting mechanism 10 is determined so as to obtain engine torque $T_E$ and the engine speed $N_E$ for generating the engine output demanded for satisfying target outputs (a total target output and demanded drive torque). Then, the speed ratio γ0 of the differential portion 211 is controlled in consideration of the gear position in the automatic shifting portion 20 so as to obtain the relevant target value, thereby controlling the total speed ratio γT within a continuously variable shifting range.

When this takes place, the hybrid control means 284 allows electric energy, generated by the first electric motor M1, to be supplied through an inverter 54 to a battery device 56 and the second electric motor M2. Thus, a major part of drive power of the engine 8 is mechanically transferred to the power transmitting member 18. However, a part of drive power of the engine 8 is consumed with the first electric motor M1 for the generation of electric power and converted into electric energy. Resulting electric energy is supplied through the inverter 54 into the second electric motor M2, which is consequently driven. Therefore, the part of drive power is transferred through the second electric motor M2 to the power transmitting member 18. Equipment, involved in the operations starting from the step of generating electric power to the step of causing the second electric motor M2 to consume resultant electric energy, establishes an electric path in which the part of the drive power of the engine 8 is converted into electric energy and resultant electric energy is converted into mechanical energy.

The hybrid control means 284 allows the differential portion 211 to perform an electrically controlled CVT function for controlling, for instance, a first-electric-motor rotational speed $N_{M1}$ and/or a second-electric-motor rotational speed $N_{M2}$ to maintain the engine speed $N_E$ at a nearly constant level or to control the rotational speed at an arbitrary level regardless of the vehicle remaining under a halted condition or a running condition. In other words, the hybrid control means 284 controls the first-electric-motor rotational speed $N_{M1}$ and/or a second-electric-motor rotational speed $N_{M2}$ at an arbitrary level while maintaining the engine speed $N_E$ at the nearly constant level or the arbitrary rotational speed.

As will be apparent from the collinear chart shown in FIG. 14, for instance, when raising the engine speed $N_E$ during the running of the vehicle, the hybrid control means 284 raises the first-electric-motor rotational speed $N_{M1}$ while maintaining a second-electric-motor rotational speed $N_{M2}$ at a nearly fixed level that is bound with the vehicle speed V (represented by the drive wheels 34). In addition, when maintaining the engine speed $N_E$ at the nearly fixed level during the shifting of the automatic shifting portion 20, the hybrid control means 284 varies the first-electric-motor rotational speed $N_{M1}$ in a direction opposite to that in which the second-electric-motor rotational speed $N_{M2}$ varies with the shifting of the automatic shifting portion 20 while maintaining the engine speed $N_E$ at the nearly fixed level.

The hybrid control means 284 causes the throttle actuator 97 to controllably open or close the electronic throttle valve 96 for performing a throttle control. In addition, the hybrid control means 284 functionally includes engine output control means that outputs commands to an engine output control device 258 singly or in combination. This causes a fuel injection device 98 to control a fuel injection quantity and a fuel injection timing for fuel injection control while causing an ignition device 99 to control an ignition timing of an ignition device 99 such as an igniter or the like for an ignition timing control. Upon receipt of such commands, the engine output control device 258 executes an output control of the engine 8 so as to provide a demanded engine output.

For instance, the hybrid control means 284 basically drives the throttle actuator 97 in response to the accelerator opening Acc by referring to the prestored relationship (not shown). The throttle control is executed such that the greater the accelerator opening Acc, the larger will be the throttle valve opening $\theta_{TH}$. Upon receipt of the commands from the hybrid control means 284, further, the engine output control device 258 allows the throttle actuator 97 to controllably open or close the electronic throttle valve 96 for throttle control while controlling the ignition timing of the ignition device 99 such as the igniter or the like for ignition timing control, thereby executing an engine torque control.

Further, the hybrid control means 284 is operative to cause the differential portion 211 to perform the electrically controlled CVT function (differential action) to achieve the motor drive mode using the second electric motor M2 as the drive force source, regardless of the engine 8 remaining under the halted condition or an idling state. For instance, the hybrid control means 284 achieves the motor drive mode in the relatively lower torque region $T_{OUT}$ i.e. low engine torque region $T_E$, or relatively lower vehicle speed region i.e. lower load region. In order to suppress a drag of the engine 8 being halted for improving fuel consumption during such a motor-drive running mode, the hybrid control means 284 controls the first-electric-motor rotational speed $N_{M1}$ in a negative rotational speed to render, for instance, the first electric motor operative under an unloaded condition, thereby achieving an idling state. In this way, the engine speed $N_E$ is zeroed or nearly zeroed depending on needs due to the electrically controlled CVT function (differential action) of the differential portion 211.

Even if the engine-drive running region which uses the engine 8 as the driving power source is present, the hybrid control means 284 allows the first electric motor M1 and/or the battery device 56 to supply electric energy to the second electric motor M2 using the electrical path mentioned above. This drives the second electric motor M2 to apply torque to the drive wheels 38, providing a so-called torque-assist for assisting drive power of the engine 8.

The hybrid control means 284 renders the first electric motor M1 operative under the unloaded condition to freely rotate in the idling state. This causes the differential portion 211 to interrupt a torque transfer; that is, the differential portion 211 is rendered inoperative with no output being provided under the same state as that in which the power transmitting path is disconnected in the differential portion 211. That is, the hybrid control means 284 places the first electric motor M1 in the unloaded condition, placing the differential portion 11 in a neutral condition (neutral state) in which the power transmitting path is electrically disconnected.

During a coast running (under a coast running state) of a vehicle with an accelerator pedal being released or during a braking mode of the vehicle with a foot brake being activated, further, the hybrid control means 284 has a function to serve as regeneration control means. In this regeneration control, the second electric motor M2 is rendered operative to act as an electric power generator and driven with kinetic energy of a vehicle, i.e. a reverse drive force transferred from the drive wheels 34 to the engine 8 to generate electric energy with a view to achieving fuel saving. Resulting electric energy, i.e. a second-motor-generated electric current is supplied via an inverter 58 to a battery 60 that is consequently charged. Such regeneration control is performed such that the regeneration is achieved at a power rate determined based on a state of charge SOC of the battery 60 and a braking force distribution rate of a braking force of a hydraulic brake actuated for obtaining the braking force depending on a depressing stroke of the brake pedal.

Next, description is made of a control operation for promptly completing the warm-up of the shifting mechanism 210 with a view to achieving improved fuel consumption.

Temperature determining means 290 determines as to whether the temperature of the shifting mechanism 210, corresponding to the temperature of the hybrid vehicle power transmitting apparatus, is less than a given first temperature determining value $TEMP_{21}$. The operation oil temperature $TEMP_{ATF}$ of the automatic shifting portion 20 is detected by, for instance, a temperature sensor to allow the temperature of the shifting mechanism 210 to be determined based on such an operation oil temperature $TEMP_{ATF}$. That is, the operation oil temperature $TEMP_{ATF}$ may be treated intact as the temperature of the shifting mechanism 210, or the temperature of the shifting mechanism 210 may be derived from a calculated value obtained by adding a given correction value, preliminarily obtained on experimental tests, to the operation oil temperature $TEMP_{ATF}$.

The first temperature determining value $TEMP_{21}$, corresponding to an on-differential-state temperature determining value of the present invention, represents a threshold value. This is a value that if the temperature of the shifting mechanism 210 is supposed to exceed the first temperature determining value $TEMP_{21}$, then a determination is made that in view of improving fuel consumption, no need particularly arises to promote the warm-up of the shifting mechanism 210, or no warm-up of the shifting mechanism 210 needs to be promoted with the use of differential-action condition altering means. The first temperature determining value $TEMP_{21}$ is obtained on experimental tests and preliminarily stored as, for instance, at 35° C. in temperature determining means 290. Moreover, the first temperature determining value $TEMP_{21}$ is lower than the temperature of the shifting mechanism 210 under a predetermined warm-up condition representing a status in which the warm-up of the shifting mechanism 210 has been completed.

Further, the temperature determining means 290 determines as to whether the temperature of the shifting mechanism 210 is less than a given second temperature determining value $TEMP_{22}$. Here, the second temperature determining value $TEMP_{22}$ is a value less than the first temperature determining value $TEMP_{21}$. The warm-up of the shifting mechanism 210 needs to be promoted regardless of whether the temperature of the shifting mechanism 210, i.e., for instance, the operation oil temperature $TEMP_{ATF}$, exceeds the second temperature determining value $TEMP_{22}$. Thus, the second temperature determining value $TEMP_{22}$ represents a threshold value based on which if the temperature of the shifting mechanism 210 is less than the second temperature determining value $TEMP_{22}$, then a determination is to be made that in view of improving fuel consumption, the warm-up of the shifting mechanism 210 needs to be further intensively promoted. This threshold value is obtained on experimental tests and preliminarily stored as, for instance, at 0° C. in the temperature determining means 290.

Motor-temperature determining means 296 determines as to whether the temperature of the first electric motor M1 is less than a given third temperature determining means $TEMP_{23}$. The temperature of the first electric motor M1 is detected with, for instance, a temperature sensor incorporated in the first electric motor M1. If the temperature of the first electric motor M1 exceeds the third motor-temperature determining value $TEMP_{23}$, the temperature of the first electric motor M1 adversely affects durability of the first electric motor M1. Thus, the third motor-temperature determining value $TEMP_{23}$ is a threshold value that enables a determination to be made that with a view to avoiding such an adverse affect, no warm-up of the shifting mechanism 210 is further intensively promoted upon operating the first electric motor M1. This threshold value is obtained on experimental tests to be preliminarily stored at, for instance, 150° C. in motor-temperature determining means 296.

Here, the motor-temperature determining means 296 determines on the temperature of the first electric motor M1. However, for instance, the third motor-temperature determining value $TEMP_{23}$ may be determined depending on an object to be determined and the temperature of the second electric motor M2 may be determined. In another alternative, an average temperature between those of the first and second electric motors M1 and M2 may be determined.

If the temperature determining means 290 determines that the temperature of the shifting mechanism 210 exceeds the first temperature determining value $TEMP_{21}$, no need particularly arises to promote the warm-up of the shifting mechanism 210. Therefore, the differential-action condition altering means 298 determines the operating point of the differential portion 211 so as to allow the vehicle as a whole to realize optimum fuel consumption. To this end, the differential-action condition altering means 298 actuates the first and second electric motors M1 and M2 so as to realize such optimum fuel consumption. In other words, the differential-action condition altering means 298 does not particularly alter the control of the differential portion 211 of the hybrid control means 284.

Further, the temperature determining means 290 determines that the temperature of the shifting mechanism 210 is less than the first temperature determining value $TEMP_{21}$. In such a case, the differential-action condition altering means 298 alters the operating point of the differential portion 211 so as to achieve an increase in temperature of at least one of the first and second electric motors M1 and M2 and operate the first and second electric motors M1 and M2 so as to realize such an altered operating point. During such an operation, the operating point may be altered such that the engine rotation speed $N_E$ and the speed ratio γ of the automatic shifting portion 20, resulting from such an altered operating point, have a lessened adverse affect on the running of the vehicle.

Now, the alteration on the operating point of the differential portion 211 will be described below in detail. If the temperature determining means 290 determines that the temperature of the shifting mechanism 210 is less than the first temperature determining value $TEMP_{21}$, the differential-action condition altering means 298 alters the operating point of the differential portion 211 such that the lower the temperature of the shifting mechanism 210, the greater will be the gross heating value of one of or both of the first and second electric motors M1 and M2.

More particularly, in one phase, the temperature determining means 290 determines that the temperature of the shifting mechanism 210 is less than the first temperature determining value $TEMP_{21}$ but exceeds the second temperature determining value $TEMP_{22}$. Under such a determination, the differential-action condition altering means 298 makes a minor operating-point alteration to alter the operating point of the differential portion 211 so as to allow the heat generation amount of one of the first and second electric motors M1 and M2 or the gross heat generation amount of both of these motors to lie at a first heating target value $H_1$. In another phase, the temperature determining means 290 determines that the temperature of the shifting mechanism 210 is less than the second temperature determining value $TEMP_{22}$. Under such a determination, the differential-action condition altering means 298 makes a major operating-point alteration to alter the operating point of the differential portion 211 at an increased point so as to allow the heat generation amount of one of the first and second electric motors M1 and M2 or the gross heat generation amount of both of these motors to lie at a second heating target value $H_2$ higher than the first heating target value $H_1$.

Figure 17:
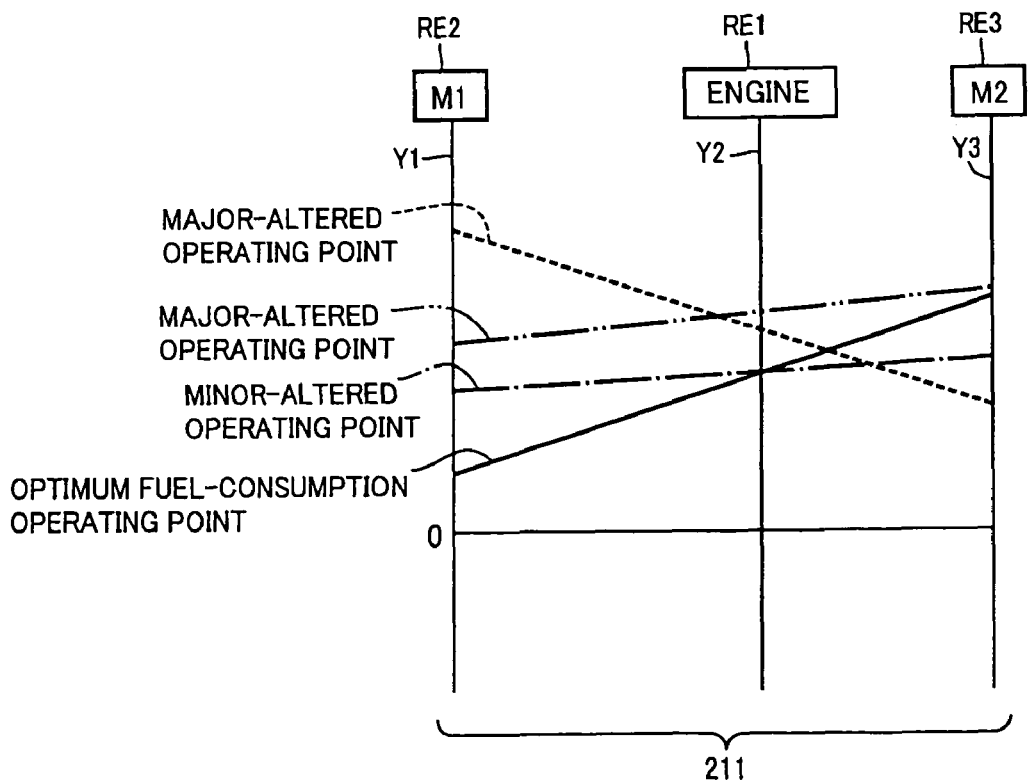
FIG. 17 is a collinear chart showing relative rotation speeds of various rotary elements of a differential portion used in illustrating one example of altering an operating point of the differential portion in the hybrid vehicle power transmitting apparatus shown in FIG. 12, with vertical lines Y1, Y2 and Y3 of FIG. 17 corresponding to the vertical lines Y1, Y2 and Y3 of FIG. 12.

As shown in, for instance, a collinear chart of the differential portion 211 shown in FIG. 17, the differential portion 211 has an operating point (an optimum fuel-consumption operating point indicated by a solid line in FIG. 17). If the minor operating-point alteration is made on such an operating point, then the operating point is shifted to an operating point serving as a minor-altered operating point as indicated by a single dot line in FIG. 17. If the major operating-point alteration is made on such an operating point, then the operating point is shifted to another operating point serving as a major-altered operating point as indicated by a double dot line in FIG. 17. Here, both the first and second heating target values $H_1$ and $H_2$ represent target values obtained upon making a comparison between an increase in dissipative energies of the first and second electric motors M1 and M2 and fuel consumption improving effects resulting from the promoted warm-up of the differential mechanism 210 to achieve improved fuel consumption of the vehicle as a whole. These target values are preliminarily obtained on experimental tests to be stored in the differential-action altering means 298.

Further, the motor-temperature determining means 296 determines i.e. denies that the temperature of the first electric motor M1 210 is less than the third temperature determining value $TEMP_{23}$. In such a case, even under a situation where the temperature determining means 290 determines that the temperature of the shifting mechanism 210 is less than the second temperature determining value $TEMP_{22}$, the differential-action altering means 298 makes no major operating-point alteration but makes the minor operating-point alteration. In other words, a query as to whether the temperature of the first electric motor M1 is less than the third temperature determining value $TEMP_{23}$ represents a query as to whether the temperature of the first electric motor M1 exceeds the third temperature determining value $TEMP_{23}$.

Figure 18:
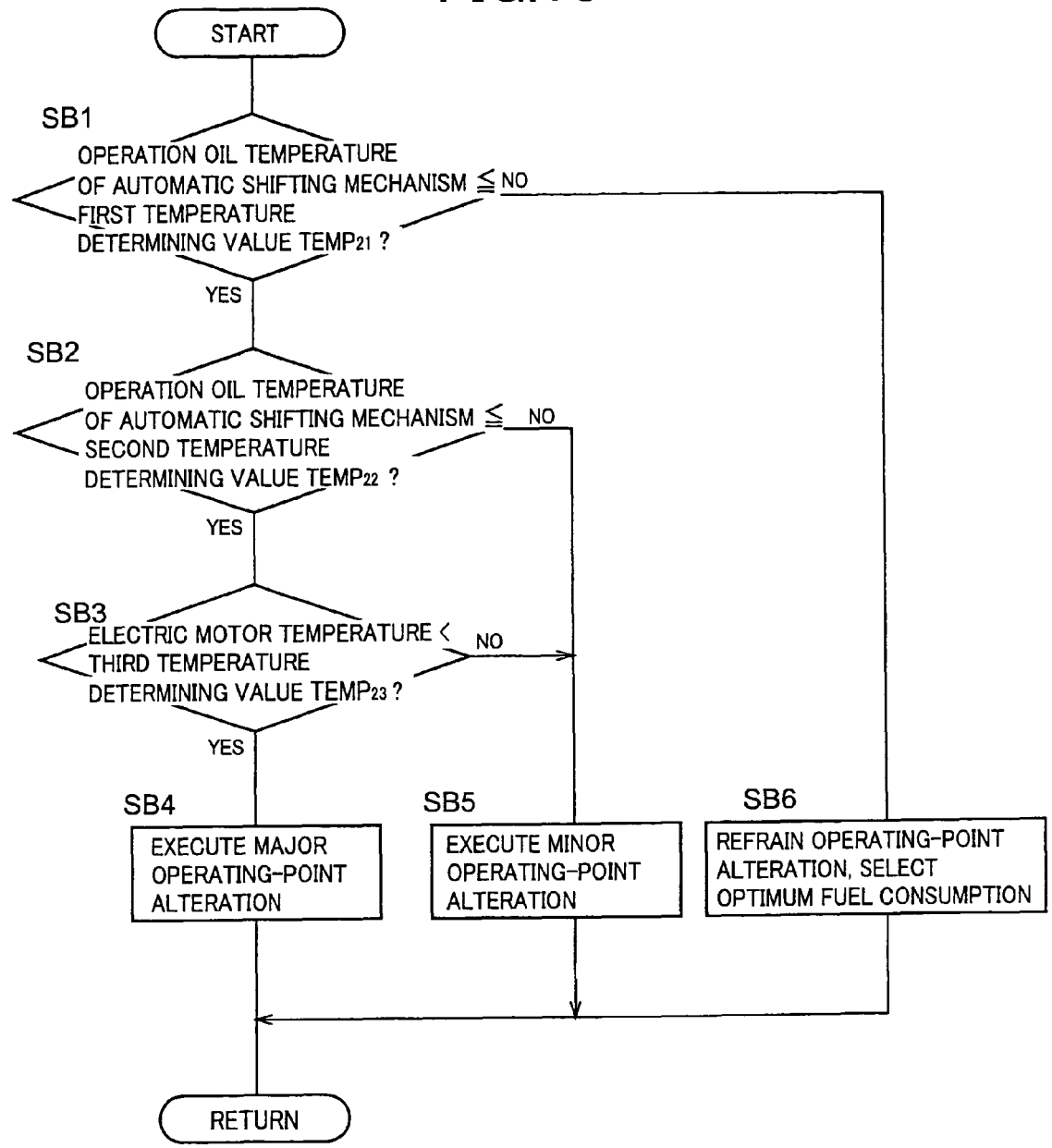
FIG. 18 is a view, showing a flow chart illustrating a major part of control operations to be executed with the electronic control device shown in FIG. 4, which represents a flow chart of a second embodiment different from the embodiment shown in FIG. 11.

FIG. 18 is a flow chart illustrating a major part of control operations, to be executed with the electronic control device 280, that is, control operations to be executed for facilitating a warm-up of the shifting mechanism 210, which are repeatedly executed on an extremely short cycle in the order of approximately, for instance, several milliseconds or several tens milliseconds. FIG. 18 shows another embodiment corresponding to FIG. 11.

First, at SB1, a query is made as to whether the temperature of the shifting mechanism 210 is less than the first temperature determining value $TEMP_{21}$. The operation oil temperature $TEMP_{ATF}$ of the automatic shifting portion 20 is detected with, for instance, the temperature sensor to allow the above query to be made regarding the operation oil temperature $TEMP_{ATF}$ to be the temperature of the shifting mechanism 210. Here, the first temperature determining value $TEMP_{21}$ is preliminarily determined at, for instance, 35° C. in the electronic control device 280. If the answer to this query is YES, that is, if the temperature of the shifting mechanism 210 is less than the first temperature determining value $TEMP_{21}$, then the flow routine goes to SB2. If, on the other hand, the answer is NO, then the flow routine proceeds to SB6.

At SB2, a query is made as to whether the temperature of the shifting mechanism 210 is less than the second temperature determining value $TEMP_{22}$. Here, the second temperature determining value $TEMP_{22}$ is preliminarily determined in the electronic control device 280 at, for instance, 0° C. If the answer to this query is YES, i.e. if the temperature of the shifting mechanism 210 is less than the second temperature determining value $TEMP_{22}$, then the flow routine goes to SB3. If, on the other hand, the answer is NO, then the flow routine proceeds to SB5. In addition, SB1 and SB2 collectively correspond to the temperature determining means 290.

At SB3 corresponding to the motor-temperature determining means 296, a query is made as to whether a temperature of an electric motor, typically, the temperature of the first electric motor M1 is less than the third temperature determining value $TEMP_{23}$. Here, the third temperature determining value $TEMP_{23}$ is preliminarily determined in the electronic control device 280 at, for instance, 150° C. If the answer to this query is YES, that is, if the temperature of the shifting mechanism 210 is less than the third temperature determining value $TEMP_{23}$, then the flow routine goes to SB4. If, on the other hand, the answer is NO, then the flow routine proceeds to SB5. In addition, although at SB3, the query is made on the temperature of the first electric motor M1, it may be possible to make a query on the temperature of the second electric motor M2. In another alternative, a query may be made on an average temperature of the first and second electric motor M1 and M2.

At SB4, the major operating-point alteration is made for altering the operating point of the differential portion 211 such that one of the heat generation amounts of the first and second electric motors M1 and M2 or the gross heat generation amount of both of these motors lies at the second heating target value $H_2$.

At SB5, the minor operating-point alteration is made for altering the operating point of the differential portion 211 such that one of the heat generation amounts of the first and second electric motors M1 and M2 or the gross heat generation amount of both of these motors lies at the first heating target value $H_1$.

At SB6, the operating point of the differential portion 211 is determined so as to allow the vehicle to realize optimum fuel consumption as a whole and the first and second electric motors M1 and M2 are operated in a way to realize such optimum fuel consumption. Also, SB4 to SB6 collectively correspond to the differential-action condition altering means 298.

The electronic control device 280 of the second embodiment has, in addition to the advantageous effects (A3), (A5), (A7) and (A9), other advantageous effects (B1) to (B4) as listed below.

(B1) If the temperature of the shifting mechanism 210 is less than the first temperature determining value $TEMP_{21}$, the differential-action condition altering means 298 alters the operating point of the differential portion 211 such that the temperature of at least one of the electric motors, i.e. at least one of the first and second electric motors M1 and M2 incorporated in the differential portion 211, increases. Therefore, with such an increase in temperature of at least one of the first and second electric motors M1 and M2, the warm-up of the shifting mechanism 210 can be promoted.

(B2) If the temperature determining means 290 determines that the temperature of the shifting mechanism 210 is less than the first temperature determining value $TEMP_{21}$, then the differential-action condition altering means 298 alters the operating point of the differential portion 211 such that the lower the temperature of the shifting mechanism 210, the greater will be the heat generation amount of at least one of the first and second electric motors M1 and M2 or the gross heat generation amount of both of these electric motors. This can avoid a delay in warm-up of the shifting mechanism 210 even if the temperature of the shifting mechanism 210 is low.

(B3) If the motor-temperature determining means 296 determines that the temperature of the first electric motors M1 exceeds the third temperature determining value $TEMP_{23}$, no major operating-point alteration for the differential portion 211 is made even if the motor-temperature determining means 296 determines that the shifting mechanism 210 is less than the second temperature determining value $TEMP_{22}$. This prevents the promoted warm-up of the first electric motor M1 from adversely affecting durability of the first electric motor.

(B4) The operating point of the differential portion 11 may be altered such that the engine rotation speed $N_E$ and the speed ratio γ of the automatic shifting portion 20, resulting from such an altered operating point, have a lessened adverse affect on the running of the vehicle. In such a case, even if the operating point of the differential portion 11 is altered, a vehicle occupant has almost no feeling on the altered operating point, with an accompanying lessened effect of causing the vehicle occupant to have uncomfortable feeling.

In the foregoing, although the present invention has been described above in detail with reference to the embodiments shown in the drawings, the particular embodiments disclosed are meant to be illustrative only and the present invention can be implemented in various other modifications and improvements in the light of knowledge of those skilled in the art.

With the first and second embodiments, for instance, the motor-temperature determining means 86 and 296 are provided for preventing the temperature of the first electric motor M1 from adversely affecting durability of the first electric motor M1. Therefore, the present invention can be implemented even in the absence of the motor-temperature determining means 86 and 296.

With the first and second embodiments, further, if the state of charge SOC of the battery 60 is less than a lower limit value, the heat generation control of the first embodiment and the operating-point alteration on the first electric motor M1 of the second embodiment may be cancelled regardless of the temperatures of the shifting mechanisms 10 and 210. Thus, the occurrence of a shortage in the state of charge SOC can be avoided.

With the first embodiment, furthermore, the heat generation control is performed under the circumstance where the switching clutch C0 is engaged to cause the differential portion 11 (power distributing mechanism 16) to be placed under the non-differential state. In such a heat generation control, the first electric motor M1 may operate to act as the electric power generator so as to increase output torque of the second electric motor M2 depending on the amount of resulting electric power. During such a control, if the amount of electric power generated by the first electric motor M1 and power consumption of the second electric motor M2 are made equal to each other, the heat generation control can be performed with almost no adversely affect on the state of charge SOC of the battery 60. In this moment, engine torque $T_E$ may be increased depending on a drop in torque of the electric motor representing a difference between output torque of the second electric motor M2 and the rotational load of the first electric motor M1.

When permitting the rotational load of the first electric motor M1 and output torque of the second electric motor M2 to be made equal to each other, the heat generation control can be performed with almost no adverse affect on output torque of the shifting mechanism 10 without altering engine torque $T_E$. In this moment, it may suffice for the battery 60 to cover an energy loss caused in the electrical path between the first and second electric motors M1 and M2.

With the second embodiment, furthermore, the motor-temperature determining means 296 determines i.e. denies that the temperature of the first electric motor M1 is less than the third temperature determining value $TEMP_{23}$, that is, the temperature of the first electric motor M1 is greater than the third temperature determining value $TEMP_{23}$. In such a case, there is a likelihood that the differential-action altering means 298 makes the minor alteration on the operating point of the first electric motor M1. For instance, however, even the minor alteration may not be performed on the operating point. In other words, if the temperature of the first electric motor M1 is greater than the third temperature determining value $TEMP_{23}$, the operation may be executed to cancel the alteration on the operating point of the first electric motor M1 to be executed by the differential-action altering means 298.

With the first and second embodiments, further, the temperatures of the shifting mechanisms 10 and 210 are determined based on the operation oil temperature $TEMP_{ATF}$ of the automatic shifting portion 20. However, the temperatures of the shifting mechanisms 10 and 210 may be determined based on an average value of temperatures detected with, for instance, a plurality of temperature sensors mounted in the case 12.

With the first and second embodiments, furthermore, the differential-action gear unit 36 may be lubricated using operation oil of the automatic shifting portion 20. In such a case, executing the control operation of the first embodiment shown in FIG. 11 and the control operation of the second embodiment shown in FIG. 18 promotes the warm-up of the differential-action gear unit 36.

With the first and second embodiments, moreover, while each of the differential portions 11 and 211 is comprised of the second electric motor M2, it can be considered to utilize a structure in the absence of the second electric motor M2.

With the first embodiment, further, while the shifting mechanism 10 includes the power distributing mechanism 16 acting as the shifting mechanism and the first electric motor M1, a so-called parallel hybrid vehicle may be provided wherein, for instance, none of the first electric motor M1 and the power distributing mechanism 16 is provided and the engine 8, the clutch, the second electric motor M2, the automatic shifting portion 20 and the drive wheels 38 are directly connected. In such a case, if the temperature determining means 80 determines that the temperature of the shifting mechanism 10 is less than the transmitting apparatus temperature determining value $TEMP_{11}$, the heat generation control means 88 performs the heat generation control using the second electric motor M2.

If the motor-temperature determining means 86 determines that the temperature of the second electric motor M2 is less than the given motor-temperature determining value $TEMP_{12}$, the heat generation control is cancelled regardless of the determining result of the temperature determining means 80, and the heat generation control means 88 executes no heat generation control. In addition, the clutch is provided between the engine 8 and the second electric motor M2 depending on needs. Thus, it can be considered that the parallel hybrid vehicle has no such a clutch.

With the first and second embodiments, while the differential portion 11, 211 (power distributing mechanism 16, 216) is configured to function as the electrically controlled continuously variable transmission in which the speed ratio γ0 is continuously varied from the minimal value $γ0_{min}$ to the maximal value $γ0_{max}$, the present invention may be applied even to a case wherein the speed ratio γ0 of the differential portion 11, 211 is not continuously varied but pretended to vary step-by-step with the use of a differential action.

In the first and second embodiments, although the engine 8 and the differential portion 11 are directly connected with each other, such connecting mode is not essential. The engine 8 and the differential portion 11 can be connected via the clutch etc.

In the shifting mechanism 10, 210 of the first and second embodiments, the first electric motor M1 and the second rotary element RE2 are directly connected, and the second electric motor M2 and the third rotary element RE3 are directly connected. However, the second electric motor M2 and the third rotary element RE3 can be indirectly connected via the engaging element such as the clutch.

In the power transmitting path in the first and second embodiments extending from the engine 8 to the drive wheel 38, the automatic shifting portion 20 is disposed next to the differential portion 11, 211, but the differential portion 11, 211 can be disposed next to the automatic shifting portion 20. In summary, the automatic shifting portion 20 is sufficiently disposed to form a part of the power transmitting path extending from the engine 8 to the drive wheel 38.

In the structure shown FIG. 1, 12, the differential portion 11, 211 and the automatic shifting portion 20 are connected to each other in series. However, the present invention can be applied to a structure even if the differential portion 11, 211 and the automatic shifting portion 20 are mechanically independent from each other, provided that a whole of the shifting mechanism 10, 210 has a function to achieve an electrically controlled differential action enabling a differential state to be electrically varied, and a function to perform a shifting on a principle different from the function of the electrically controlled differential action. In summary, the automatic shifting portion 20 is sufficiently provided to form the part of the power transmitting path extending from the engine 8 to the drive wheel 38.

In the differential-portion planetary gear unit 24, the engine 8 is connected to the first rotary element RE1 in the power transmissive state, the first electric motor M1 is connected to the second rotary element RE2 in the power transmissive state, and the power transmitting path extended to the drive wheel 38 is connected to the third rotary element RE3. However, when two planetary gear units are connected with each other by a part of the rotary elements forming them, the present invention can be applied to a structure in which with the engine, the electric motor and the drive wheel being respectively connected to the rotary elements of respective planetary gear units in the power transmissive state, the clutch or brake connected to the rotary element of the planetary gear unit is controlled to change the structure to the step-variable state or the continuously variable state.

The automatic shifting portion 20 serving the step-variable automatic transmission in the first and second embodiments, may include a continuously variable CVT.

With the first and second embodiments, although the second electric motor M2 is directly connected to the power transmitting member 18, the connecting position of the second electric motor M2 is not limited to such mode. That is, the second electric motor M2 is sufficiently connected to the power transmitting path extending from the engine 8 or the power transmitting member 18 to the drive wheel 38, directly or indirectly via the transmission, planetary gear unit, engaging device and the like.

With the power distribution mechanisms 16, 216 of the first and second embodiments, the differential-portion carrier CA0 is connected to the engine 8; the differential-portion sun gear S0 is connected to the first electric motor M1; and the differential-portion ring gear R0 is connected to the power transmitting member 18. However, the present invention is not necessarily limited to such connecting arrangement, and the engine 8, first electric motor M1 and power transmitting member 18 have no objection to be connected to either one of the three elements CA0, S0 and R0 of the differential-portion planetary gear set 24.

In the first and second embodiments, although the engine 8 is directly connected to the input shaft 14, these component parts may suffice to be operatively connected via, for instance, gears, belts or the like. The engine 8 and the input shaft 14 need not be disposed on a common axis.

Further, while in the first and second embodiments, with the first electric motor M1 and the second electric motor M2 being disposed coaxial with the input shaft 14, the first electric motor M1 is connected to the differential-portion sun gear S0, and the second electric motor M2 is connected to the power transmitting member 18. However, no need arises for these component parts to be necessarily placed in such connecting arrangement. For example, the first electric motor M1 may be connected to the differential-portion sun gear S0 through gears, a belt or the like, and the second electric motor M2 may be connected to the power transmitting member 18.

The power distributing mechanism 16, 216 of the first and second embodiments having been described above as including one set of planetary gear units, may include two or more sets of planetary gear units that are arranged to function as a transmission having three or more speed positions under a non-differential state (fixed shifting state). In addition, the planetary gear unit is not limited to the single-pinion type, but may be of a double-pinion type.

In the first and second embodiments, the second electric motor M2 is directly connected to the power transmitting member 18 forming the part of the power transmitting path extending from the engine 8 to the drive wheel 38 in the first and third embodiments. However, it may be indirectly connected to the power transmitting member 18 via a transmission or the like. In the shifting mechanism 10, the second electric motor M2 is connected to the power transmitting member 18 and can be connected to the power distributing mechanism 16, 216 via the engaging device such as the clutch. Therefore, the shifting mechanism 10, 210 can be constructed such that the second electric motor M2, instead for the first electric motor M1, controls the differential state of the power distributing mechanism 16, 216.

The first to third embodiments may be implemented in a mutually combined form upon providing, for instance, a priority order.

What is claimed is:

1. A control device for a hybrid vehicle power transmitting apparatus, wherein,
   the hybrid vehicle power transmitting apparatus comprises
   (i) an electrically controlled differential portion having a differential mechanism connected between an internal combustion engine and drive wheels and at least one electric motor connected to the differential mechanism in a power transmissive state for controlling a differential state of the differential mechanism upon controlling an operating state of the electric motor, (ii) a shifting portion forming part of a power transmitting path, and (iii) a differential-state switching mechanism for switching the electrically controlled differential portion in a differential state operative to establish a differential action and a non-differential state in which the differential action is disabled,
   the control device executes a heat generation control for increasing a heat generation amount of the at least one electric motor when the electrically controlled differential portion is placed under the non-differential state and a temperature of the hybrid vehicle power transmitting apparatus is less than a temperature determining value given for the non-differential state, and
   the control device alters an operating point of the electrically controlled differential portion, representing a condition for determining a relative rotation speed between rotary elements forming the differential mechanism, so as to increase a temperature of the at least one electric motor when the electrically controlled differential portion is placed under the differential state and the temperature of the hybrid vehicle power transmitting apparatus is less than a temperature determining value given for the differential state.

2. The control device for the hybrid vehicle power transmitting apparatus according to claim 1, wherein the electrically controlled differential portion includes a first electric motor and a second electric motor forming the electric motor;
   and the differential mechanism includes a first rotary element connected to the internal combustion engine in a power transmissive state, a second rotary element connected to the first electric motor in a power transmissive state, and a third rotary element connected to the second electric motor in a power transmissive state; and the control device executes the heat generation control upon increasing a heat generation amount of at least one of the first electric motor and the second electric motor.

3. The control device for the hybrid vehicle power transmitting apparatus according to claim 2, wherein the electrically controlled differential portion operates to act as a continuously variable shifting mechanism by controlling an operating state of the first electric motor.

4. The control device for the hybrid vehicle power transmitting apparatus according to claim 1, wherein the control device executes the heat generation control such that the lower the temperature of the hybrid vehicle power transmitting apparatus, the greater will be the heat generation amount of the at least one electric motor.

5. The control device for the hybrid vehicle power transmitting apparatus according to claim 1, wherein the control device determines the temperature of the hybrid vehicle power transmitting apparatus based on a temperature of liquid prevailing in the hybrid vehicle power transmitting apparatus.

6. The control device for the hybrid vehicle power transmitting apparatus according to claim 1, wherein when a temperature of the at least one electric motor exceeds a given motor-temperature determining value, the control device cancels the heat generation control, performed using the electric motor laying at a temperature above the motor-temperature determining value, regardless of the temperature of the hybrid vehicle power transmitting apparatus.

7. The control device for the hybrid vehicle power transmitting apparatus according to claim 1, wherein the shifting portion includes a step-variable automatic shifting portion whose speed ratio is automatically varied.

8. The control device for the hybrid vehicle power transmitting apparatus according to claim 1, wherein the control device operates to increase output torque of the at least one electric motor with an increase in a heat generation amount of such an electric motor.

9. The control device for the hybrid vehicle power transmitting apparatus according to claim 1, wherein the at least one electric motor has an electric power generating function, and the control device operates to increase the amount of electric power generated by the electric motor having the electric power generating function, to thereby increase the heat generation amount of the electric motor.

10. The control device for the hybrid vehicle power transmitting apparatus according to claim 1, wherein the control device operates to alter output torque of the internal combustion engine depending on fluctuation in output torque or a rotational load of the electric motor used in the heat generation control such that output torque of the hybrid vehicle power transmitting apparatus approaches that of the hybrid vehicle power transmitting apparatus with no execution of the heat generation control.

11. The control device for the hybrid vehicle power transmitting apparatus according to claim 1, wherein the electric motor used in executing the heat generation control is cooled with liquid prevailing in the hybrid vehicle power transmitting apparatus.

* * * * *